US011930485B2

(12) United States Patent
Ying et al.

(10) Patent No.: US 11,930,485 B2
(45) Date of Patent: Mar. 12, 2024

(54) USER EQUIPMENT AND BASE STATIONS THAT ACHIEVE ULTRA RELIABLE AND LOW LATENCY COMMUNICATIONS

(71) Applicant: SHARP KABUSHIKI KAISHA, Sakai (JP)

(72) Inventors: Kai Ying, Vancouver, WA (US); Tatsushi Aiba, Sakai (JP); John Michael Kowalski, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 435 days.

(21) Appl. No.: 17/279,586

(22) PCT Filed: Sep. 27, 2019

(86) PCT No.: PCT/JP2019/038378
§ 371 (c)(1),
(2) Date: Mar. 25, 2021

(87) PCT Pub. No.: WO2020/067515
PCT Pub. Date: Apr. 2, 2020

(65) Prior Publication Data
US 2021/0345366 A1 Nov. 4, 2021

Related U.S. Application Data

(60) Provisional application No. 62/737,774, filed on Sep. 27, 2018.

(51) Int. Cl.
*H04W 4/00* (2018.01)
*H04L 1/00* (2006.01)
(Continued)

(52) U.S. Cl.
CPC ....... *H04W 72/1263* (2013.01); *H04L 1/0061* (2013.01); *H04W 72/0446* (2013.01);
(Continued)

(58) Field of Classification Search
CPC . H04W 72/04; H04W 72/0466; H04W 72/12; H04W 72/1263; H04L 1/0061
See application file for complete search history.

(56) References Cited

U.S. PATENT DOCUMENTS

2016/0219547 A1* 7/2016 Seo .................. H04W 72/21
2017/0019930 A1* 1/2017 Lee .................. H04W 72/21
(Continued)

OTHER PUBLICATIONS

International Search Authority, Written Opinion of the International Searching Authority PCT/JP2019/038378, dated Nov. 12, 2019, pp. 1-3. (Year: 2019).*
(Continued)

*Primary Examiner* — Chi H Pham
*Assistant Examiner* — Elisabeth Benoit Magloire
(74) *Attorney, Agent, or Firm* — ScienBiziP, P.C.

(57) ABSTRACT

A user equipment, including: receiving circuitry and transmitting circuitry. The receiving circuitry configured to receive a first radio resource control (RRC) message including first information used for a physical uplink shared channel (PUSCH) transmission corresponding to a configured grant, and a second RRC message comprising second information used for a PUSCH transmission scheduled by a physical downlink control channel (PDCCH) with cyclic redundancy check (CRC) scrambled by a cell-radio network temporary identifier (C-RNTI). The first information including first parameters and a second parameter, and the second information including a third parameter. The transmitting circuitry configured to perform a PUSCH initial transmission corresponding to the configured grant by using the first parameters and the second parameter, and perform, based on
(Continued)

detection of a second PDCCH, the PUSCH retransmission corresponding to the configured grant by using the first parameters and the third parameter.

4 Claims, 15 Drawing Sheets

(51) Int. Cl.
    *H04W 72/044*     (2023.01)
    *H04W 72/0446*     (2023.01)
    *H04W 72/0453*     (2023.01)
    *H04W 72/1263*     (2023.01)
    *H04W 72/23*     (2023.01)

(52) U.S. Cl.
    CPC ... *H04W 72/0453* (2013.01); *H04W 72/0466* (2013.01); *H04W 72/23* (2023.01)

(56) References Cited

U.S. PATENT DOCUMENTS

| | | | |
|---|---|---|---|
| 2017/0366377 A1* | 12/2017 | Papasakellariou | H04L 5/0053 |
| 2018/0176945 A1 | 6/2018 | Cao et al. | |
| 2018/0323909 A1* | 11/2018 | Ying | H04L 1/1822 |
| 2018/0368117 A1* | 12/2018 | Ying | H04L 1/0061 |

OTHER PUBLICATIONS

Huawei et al., "New SID on Physical Layer Enhancements for NR URLLC", RP-181477, 3GPP TSG-RAN#80, La Jolla, US, Jun. 11-14, 2018.

Vivo, "Summary of 7.1.3.3.6—URLLC related aspects", R1-1807646, 3GPP TSG RAN WG1 Meeting #93, Busan, Korea, May 21-May 25, 2018.

Vivo, "Summary of Multiplexing data with different transmission durations", R1-1805529, 3GPP TSG RAN WG1 Meeting #92bis, Sanya, China, Apr. 16-20, 2018.

Vivo, "Summary of 7.3.3.6 multiplexing data with different transmission durations", R1-1801155, 3GPP TSG RAN WG1 Meeting AH 1801, Vancouver, Canada, Jan. 22-26, 2018.

"3rd Generation Partnership Project; Technical Specification Group Radio Access Network; NR; Radio Resource Control (RRC) protocol specification(Release 15)", 3GPP TS 38.331 V15.2.0 (Jun. 2018).

"3rd Generation Partnership Project; Technical Specification Group Radio Access Network; NR; Medium Access Control (MAC) protocol specification(Release 15)", 3GPP TS 38.321 V15.2.0 (Jun. 2018).

"3rd Generation Partnership Project; Technical Specification Group Radio Access Network; NR; Physical channels and modulation(Release 15)", 3GPP TS 38.211 V15.2.0 (Jun. 2018).

"3rd Generation Partnership Project; Technical Specification Group Radio Access Network; NR; Multiplexing and channel coding(Release 15)", 3GPP TS 38.212 V15.2.0 (Jun. 2018).

"3rd Generation Partnership Project; Technical Specification Group Radio Access Network; NR; Physical layer procedures for data(Release 15)", 3GPP TS 38.214 V15.2.0 (Jun. 2018).

"3rd Generation Partnership Project; Technical Specification Group Radio Access Network; NR; Physical layer procedures for control(Release 15)", 3GPP TS 38.213 V15.2.0 (Jun. 2018).

Huawei et al., "Overview of URLLC support in NR", R1-1608843, 3GPP TSG RAN WG1 Meeting #86bis, Lisbon, Portugal, Oct. 10-14, 2016.

"3rd Generation Partnership Project; Technical Specification Group Services and System Aspects; Feasibility Study on New Services and Markets Technology Enablers—Critical Communications; Stage 1(Release 14)", 3GPP TR 22.862 V1.0.0 (Feb. 2016).

"3rd Generation Partnership Project; Technical Specification Group Radio Access Network; Study on Scenarios and Requirements for Next Generation Access Technologies;(Release 14)", 3GPP TR 38.913 V0.3.0 (Mar. 2016).

* cited by examiner

USER EQUIPMENT AND BASE STATIONS THAT ACHIEVE ULTRA RELIABLE AND LOW LATENCY COMMUNICATIONS

CROSS REFERENCE

This Nonprovisional application claims priority under 35 U.S.C. § 119 on provisional Application No. 62/737,774 on Sep. 27, 2018, the entire contents of which are hereby incorporated by reference.

TECHNICAL FIELD

The present disclosure relates generally to communication systems. More specifically, the present disclosure relates to user equipments, base stations and methods for ultra-reliable and low-latency communications.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment, comprising: receiving circuitry configured to receive a radio resource control (RRC) message comprising first information used for a physical uplink shared channel (PUSCH) transmission corresponding to a configured grant, the first information comprising a first parameter(s) and a second parameter(s), the first parameter being for power control, the second parameter(s) being for configuring a type of frequency resource allocation, the receiving circuitry configured to receive an RRC message comprising second information used for a PUSCH transmission scheduled by a physical downlink control channel (PDCCH) with cyclic redundancy check (CRC) scrambled by a cell-radio network temporary identifier (C-RNTI), the second information comprising a third parameter(s) for configuring a type of frequency resource allocation, the receiving circuitry configured to monitor a PDCCH with CRC scrambled by a configured scheduling radio network temporary identifier (CS-RNTI), the PDCCH being used for scheduling of a PUSCH retransmission corresponding to the configured grant, and transmitting circuitry configured to perform a PUSCH initial transmission corresponding to the configured grant by using the first parameter(s) and the second parameter(s), the transmitting circuitry configured to perform, based on detection of the PDCCH, the PUSCH retransmission corresponding to the configured grant by using the first parameter(s) and the third parameter(s).

In one example, a base station, comprising: transmitting circuitry configured to transmit a radio resource control (RRC) message comprising first information used for a physical uplink shared channel (PUSCH) transmission corresponding to a configured grant, the first information comprising a first parameter(s) and a second parameter(s), the first parameter(s) being for power control, the second parameter(s) being for configuring a type of frequency resource allocation, the transmitting circuitry configured to transmit an RRC message comprising second information used for a PUSCH transmission scheduled by a physical downlink control channel (PDCCH) with cyclic redundancy check (CRC) scrambled by a cell-radio network temporary identifier (C-RNTI), the second information comprising a third parameter(s) for configuring a type of frequency resource allocation, the transmitting circuitry configured to transmit a PDCCH with CRC scrambled by a configured scheduling radio network temporary identifier (CS-RNTI), the PDCCH being used for scheduling of a PUSCH retransmission corresponding to the configured grant, and reception circuitry configured to receive a PUSCH initial transmission corresponding to the configured grant by using the first parameter(s) and the second parameter(s), the reception circuitry configured to receive the PUSCH retransmission which is scheduled by the PDCCH and corresponds to the configured grant by using the first parameter(s) and the third parameter(s).

In one example, a method by a user equipment, comprising: receiving a radio resource control (RRC) message comprising first information used for a physical uplink shared channel (PUSCH) transmission corresponding to a configured grant, the first information comprising a first parameter(s) and a second parameter(s), the first parameter being for power control, the second parameter(s) being for configuring a type of frequency resource allocation, receiving an RRC message comprising second information used for a PUSCH transmission scheduled by a physical downlink control channel (PDCCH) with cyclic redundancy check (CRC) scrambled by a cell-radio network temporary identifier (C-RNTI), the second information comprising a third parameter(s) for configuring a type of frequency resource allocation, monitoring a PDCCH with CRC scrambled by a configured scheduling radio network temporary identifier (CS-RNTI), the PDCCH being used for scheduling of a PUSCH retransmission corresponding to the configured grant, performing a PUSCH initial transmission corresponding to the configured grant by using the first parameter(s) and the second parameter(s), and performing, based on detection of the PDCCH, the PUSCH retransmission corresponding to the configured grant by using the first parameter(s) and the third parameter(s).

In one example, a method by a base station, comprising: transmitting a radio resource control (RRC) message comprising first information used for a physical uplink shared channel (PUSCH) transmission corresponding to a configured grant, the first information comprising a first parameter(s) and a second parameter(s), the first parameter(s) being for power control, the second parameter(s) being for configuring a type of frequency resource allocation, transmitting an RRC message comprising second information used for a PUSCH transmission scheduled by a physical downlink control channel (PDCCH) with cyclic redundancy check (CRC) scrambled by a cell-radio network temporary identifier (C-RNTI), the second information comprising a third parameter(s) for configuring a type of frequency resource allocation, transmitting a PDCCH with CRC scrambled by a configured scheduling radio network temporary identifier (CS-RNTI), the PDCCH being used for scheduling of a PUSCH retransmission corresponding to the configured grant, receiving a PUSCH initial transmission corresponding to the configured grant by using the first parameter(s) and the second parameter(s), and receiving the PUSCH retransmission which is scheduled by the PDCCH and corresponds to the configured grant by using the first parameter(s) and the third parameter(s).

DESCRIPTION OF EMBODIMENTS

Figure 1:
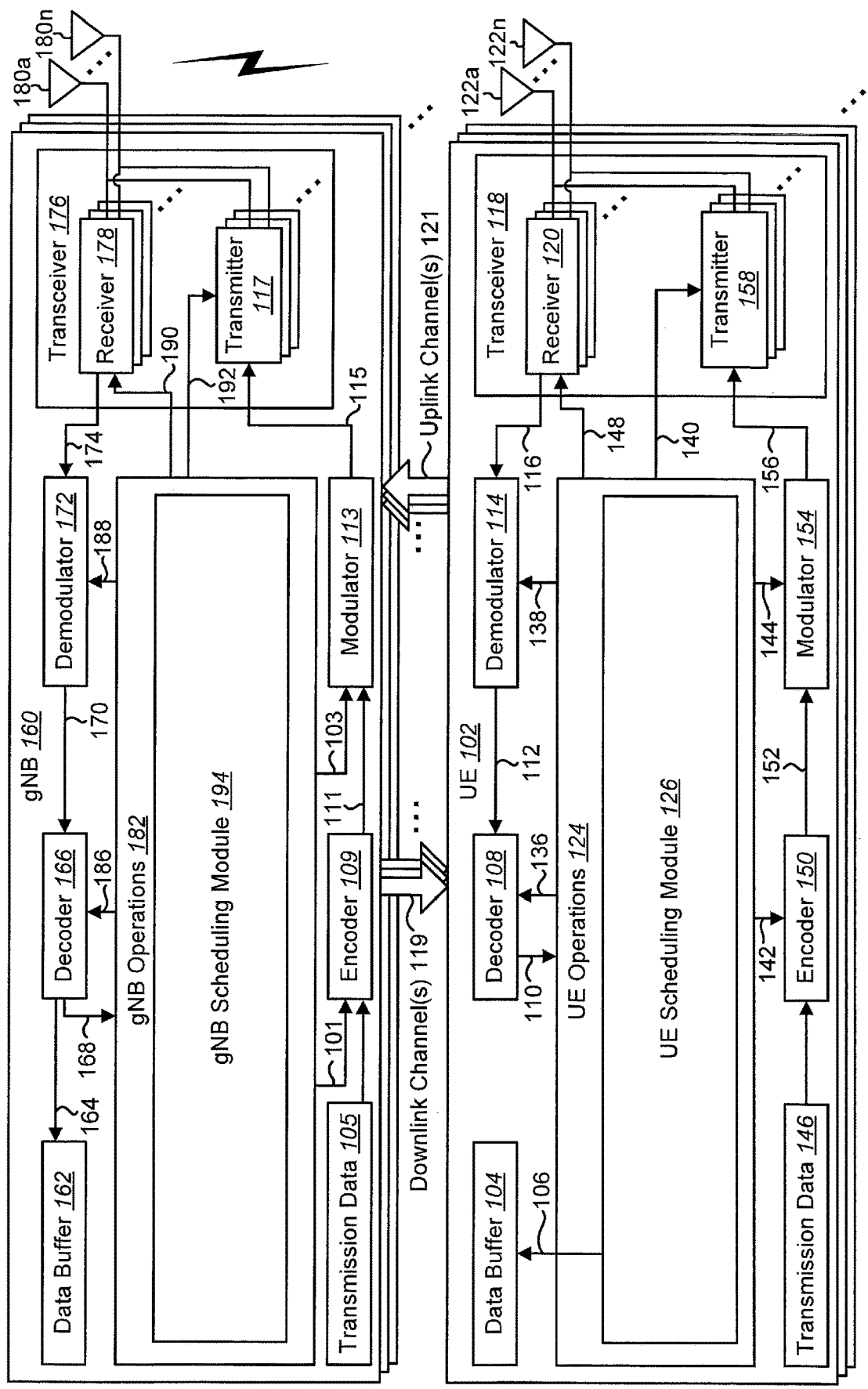
FIG. 1 is a block diagram illustrating one implementation of one or more base stations (gNBs) and one or more user equipments (UEs) in which systems and methods for ultra-reliable and low-latency communications may be implemented.

A user equipment (UE) is described. The UE includes receiving circuitry configured to monitor a physical downlink control channel (PDCCH) conveying a pre-emption indication that indicates pre-emption of a physical uplink shared channel (PUSCH) transmission. The receiving circuitry is also configured to receive radio resource control (RRC) signaling that comprises a configuration for a configured grant and a configuration for grant-based PUSCH. The UE also includes a higher layer processor configured to determine whether to follow the configuration for the configured grant or the configuration for grant-based PUSCH for a scheduled retransmission of a TB previously transmitted on a PUSCH with a configured grant. The UE further includes transmitting circuitry configured to transmit or skip the PUSCH transmission based on the pre-emption indication.

The UE may follow the configuration for the configured grant for the scheduled retransmission. The UE may follow the configuration for the grant-based PUSCH for the scheduled retransmission. Whether the UE follows the configuration for the configured grant or the configuration for the grant-based PUSCH for the scheduled retransmission may be configurable.

Whether the UE follows the configuration for the configured grant or the configuration for the grant-based PUSCH for the scheduled retransmission may be based on a type of the configured grant. Whether the UE follows the configuration for the configured grant or the configuration for the grant-based PUSCH for the scheduled retransmission may be based on a downlink control information (DCI) format used for scheduling the scheduled retransmission.

The UE may monitor the pre-emption indication periodically and monitoring occasions are determined by higher layer parameters or indicated by L1 signaling. The UE may monitor the pre-emption indication after a UL grant is detected until a corresponding UL transmission has finished or after the configured grant being activated or configured by RRC.

A base station (gNB) is also described. The gNB includes transmitting circuitry configured to send, to a UE, a PDCCH conveying a pre-emption indication that indicates pre-emption of a PUSCH transmission. The transmitting circuitry is also configured to send, to the UE, RRC signaling that includes a configuration for a configured grant and a configuration for grant-based PUSCH. The UE determines whether to follow the configuration for the configured grant or the configuration for grant-based PUSCH for a scheduled retransmission of a TB previously transmitted on a PUSCH with a configured grant. The gNB also includes receiving circuitry configured to receive the PUSCH transmission based on the pre-emption indication.

A method by a UE is also described. The method includes monitoring a PDCCH conveying a pre-emption indication that indicates pre-emption of a PUSCH transmission. The method also includes receiving RRC signaling that includes a configuration for a configured grant and a configuration for grant-based PUSCH. The method further includes determining whether to follow the configuration for the configured grant or the configuration for grant-based PUSCH for a scheduled retransmission of a TB previously transmitted on a PUSCH with a configured grant. The method additionally includes transmitting or skipping the PUSCH transmission based on the pre-emption indication.

A method by gNB is also described. The method includes sending, to a UE, a PDCCH conveying a pre-emption indication that indicates pre-emption of a PUSCH transmission. The method also includes sending, to the UE, RRC signaling that includes a configuration for a configured grant and a configuration for grant-based PUSCH. The UE determines whether to follow the configuration for the configured grant or the configuration for grant-based PUSCH for a scheduled retransmission of a TB previously transmitted on a PUSCH with a configured grant. The method further includes receiving the PUSCH transmission based on the pre-emption indication.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

Some configurations of the systems and methods described herein teach approaches for URLLC transmission/retransmission management to meet the latency/reliability requirement. Some requirements for URLLC relate to user (U)-plane latency and reliability. For URLLC, the target user plane latency is 0.5 milliseconds (ms) each way for both UL and DL. The target reliability is $1\text{-}10^{-5}$ for X bytes within 1 milliseconds (ms).

These URLLC-specific constraints make the hybrid automatic repeat request (HARM) and retransmission mechanism design difficult. For example, the receiver must reply with a quick acknowledgement (ACK) or negative acknowledgement (NACK) or an uplink grant to meet the latency requirement, or the transmitter can retransmit immediately without waiting for ACK/NACK to enhance the reliability. On the other, grant-based or grant-free repetitions are supported to further enhance the reliability. How to terminate the repetitions is also an important issue. The described systems and methods teach URLLC HARQ/retransmission design in different cases.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) 160 and one or more user equipments (UEs) 102 in which systems and methods for downlink semi-persistent scheduling may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform uplink (UL) multiplexing. In new radio (NR), a UE 102 may support multiple types of UL transmissions (PUSCH transmissions). The UL transmissions may include grant-based UL transmissions (e.g., UL transmissions with grant, dynamic grants, PUSCH transmissions with grant, PUSCH transmission scheduled by DCI (e.g., DCI format 0_0, DCI format 0_1)) and grant-free UL transmissions (e.g., UL transmissions without grant, configured grants, PUSCH transmissions with configured grant).

There may be two types of grant-free UL transmissions (e.g., UL transmissions without grant, configured grants, PUSCH transmissions with configured grant). One type of grant-free UL transmission is a configured grant Type 1 and the other is configured grant Type 2.

For Type 1 PUSCH transmissions with a configured grant, related parameters may be fully RRC-configured (e.g., configured by using RRC signaling). For example, parameters for resource allocation, such as time domain resource allocation (e.g., timeDomainOffset, timeDomainAllocation), frequency domain resource allocation (frequencyDomainAllocation), modulation and coding scheme (MCS) (e.g., mcsAndTBS), the antenna port value, the bit value for DM-RS sequence initialization, precoding information and number of layers, SRS resource indicator (provided by antennaPort, dmrs-SeqInitialization, precodingAndNumberOfLayers, and srsResourceIndicator respectively), the frequency offset between two frequency hops (frequencyHoppingOffset), etc., may be provided by RRC message (rrc-ConfiguredUplinkGrant).

Activation (e.g., PDCCH, DCI activation) may not be used for Type 1 configured grant. Namely, for configured grant Type 1, an uplink grant is provided by RRC, and stored as configured uplink grant. The retransmission of configured grant type 1 may be scheduled by PDCCH with CRC scrambled by CS-RNTI (Configured Scheduling RNTI).

For Type 2 PUSCH transmissions with a configured grant, the related parameters follow the higher layer configuration (e.g., periodicity, the number of repetitions, etc.), and UL grant received on the DCI addressed to CS-RNTI (PDCCH with CRC scrambled by CS-RNTI, L1 activation/reactivation). Namely, for configured grant Type 2, an uplink grant may be provided by PDCCH, and stored or cleared as a configured uplink grant based on L1 signaling indicating configured uplink grant activation or deactivation.

The retransmission of configured grant type 2 may be scheduled by PDCCH with CRC scrambled by CS-RNTI. Namely, retransmissions except for repetition of configured uplink grants may use uplink grants addressed to CS-RNTI. The UE 102 may not transmit anything on the resources configured for PUSCH transmissions with configured grant if the higher layers did not deliver a transport block to transmit on the resources allocated for uplink transmission without grant.

Therefore, in NR, a UE 102 may support multiple types of uplink transmissions without grant (also referred to as grant-free (GF) uplink transmission or GF transmission or transmission by configured grant). A first type (Type 1) of GF transmission may be a UL data transmission without grant that is only based on RRC (re)configuration without any L1 signaling. In a second type (Type 2) of GF transmission, UL data transmission without grant is based on both RRC configuration and L1 signaling for activation/deactivation for UL data transmission without grant. An example for RRC configuration is shown in Listing 1.

Listing 1

```
-- ASN1START
-- TAG-CONFIGUREDGRANTCONFIG-START
ConfiguredGrantConfig ::=              SEQUENCE {
frequencyHopping                       ENUMERATED {mode1, mode2}
                                       OPTIONAL, -- Need S,
cg-DMRS-Configuration                  DMRS-UplinkConfig,
mcs-Table                              ENUMERATED {qam256, spare1}
                                       OPTIONAL, -- Need S
mcs-TableTransformPrecoder             ENUMERATED {qam256, spare1}
                                       OPTIONAL, -- Need S
uci-OnPOSCH                            SetupRelease {
                                       CG-UCI-OnPUSCH},
resourceAllocation                     ENUMERATED {
                                       resourceAllocationType0,
                                       resourceAllocationType1,
                                       dynamicSwitch 1,
rbg-Size                               ENUMERATED {config2}
                                       OPTIONAL, -- Need S
powerControlLoopToUse                  ENUMERATED {n0, n1},
p0-PUSCH-Alpha                         P0-PUSCH-AlphaSetId,
transformPrecoder                      ENUMERATED {enabled}
nrofHARQ-Processes                     INTEGER(1..16),
repK                                   ENUMERATED {n1, n2, n4, n8},
repK-RV                                ENUMERATED {s1-0231,
                                       s2-0303,
                                       s3-0000}
                                       OPTIONAL, -- Cond RepK
periodicity                            ENUMERATED {
                                       sym2, sym7, sym1×14,
                                       sym2×14, sym4×14,
                                       sym5×14, sym8×14,
                                       sym10×14, sym16×14,
                                       sym20×14, sym32×14,
                                       sym40×14, sym64×14,
                                       sym80×14, sym128×14,
                                       sym160×14, sym256×14,
                                       sym320×14, sym512×14,
                                       sym640×14, sym1024×14,
                                       sym1280×14, sym2560×14,
                                       sym5120×14, sym6,
                                       sym1×12, sym2×12,
                                       sym4×12, sym5×12,
                                       sym8×12, sym10×12,
                                       sym16×12, sym20×12,
                                       sym32×12, sym40×12,
                                       sym64×12, sym80×12,
                                       sym128×12, sym160×12,
                                       sym256×12, sym320×12,
                                       sym512×12, sym640×12,
                                       sym1280×12, sym2560×12
                                       },
configuredGrantTimer                   INTEGER (1..64)
                                       OPTIONAL, -- Need R
rrc-ConfiguredUplinkGrant              SEQUENCE {
timeDomainOffset                       INTEGER (0..5119),
timeDomainAllocation                   INTEGER (0..15),
frequencyDomainAllocation              BIT STRING (SIZE(18)),
antennaPort                            INTEGER (0..31),
dmrs-SeqInitialization                 INTEGER (0..1)
                                       OPTIONAL, -- Cond NoTransformPrecoder
precodingAndNumberOfLayers             INTEGER (0..63),
srs-ResourceIndicator                  INTEGER (0..15),
mcsAndTBS                              INTEGER (0..31),
frequencyHoppingOffset                 INTEGER (1..
                                       maxNrofPhysicalResourceBlocks-1)
                                       OPTIONAL, -- Need M
pathlossReferenceIndex                 INTEGER. (0..
                                       maxNrofPUSCH-PathloSsReferenceRSs-1),
...
```

Listing 1

```
}
OPTIONAL -- Need R
}
CG-UCI-OnPUSCH ::= CHOICE {
dynamic                        SEQUENCE (SIZE (1..4)) OF BetaOffsets,
semiStatic                     BetaOffsets
}
-- TAG-CONFIGUREDGRANTCONFIG-STOP
-- ASN1STOP
```

For Type 2, PDCCH activation is needed. Listing 2 and Listing 3 show examples of DCI format 0_0 (e.g., fallback DCI) and format 0_1, which may be used for activation of a Type 2 configured grant, and/or retransmission of Type 2 configured grant and/or Type 1 configured grant.

Listing 2

Identifier for DCI formats - [1] bit
Frequency domain resource assignment
Time domain resource assignment - X bits as defined in Subclause 6.1.2.1 of [6, TS38.214]
Frequency hopping flag - 1 bit.
Modulation and coding scheme - 5 bits as defined in Subclause 6.1.3 of [6, TS38.214]
New data indicator - 1 bit
Redundancy version - 2 bits as defined in Table 7.3.1.1.1-2
HARQ process number - bits
TPC command for scheduled PUSCH - [2] bits as defined in Subclause x.x of [ 5, TS38.213]
UL/SUL indicator - 1 bit for UEs configured with SUL in the cell as defined in Table 7.3.1.1.1-1 and the number of bits for DCI format 1_0 before padding is larger than the number of bits for DCI format 0_0 before padding; 0 bit otherwise.

Listing 3

Carrier indicator - 0 or 3 bits, as defined in Subclause x.x of [5, TS38.213].
UL/SUL indicator - 0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1 [TS38.212].
Identifier for DCI formats - [1] bit
Bandwidth part indicator - 0, 1 or 2 bits as defined in Table 7.3.1.1.2-1 The [TS38.212]. The bitwidth for this field is determined according to the higher layer parameter BandwidthPart-Config for the PUSCH.
Frequency domain resource assignment
Time domain resource assignment - 0, 1, 2, 3, or 4 bits as defined in Subclause 6.1.2.1 of [6, TS38.214]. The bitwidth for this field is determined as $\lceil \log_2(I) \rceil$ bits, where I the number of rows in the higher layer parameter [pusch-symbolAllocation].
VRB-to-PRB mapping - 0 or 1 bit
Frequency hopping flag - 0 or 1 bit
New data indicator - 1 bit
Redundancy version - 2 bits as defined in Table 7.3.1.1.1-2
HARQ process number - 4 bits
$1^{st}$ downlink assignment index - 1 or 2 bits
$2^{nd}$ downlink assignment index - 0 or 2 bits
TPC command for scheduled PUSCH - 2 bits as defined in Subclause 7.1.1 of [5, TS38.213]
SRS resource indicator
Precoding information and number of layers - number of bits determined by the following:
Antenna ports - number of bits determined by the following
SRS request - 2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24.
CSI request - 0, 1, 2, 3, 4, 5, or 6 bits determined by higher layer parameter ReportTriggerSize.
CBG transmission information (CBGTI) - 0, 2, 4, 6, or 8 bits determined by higher layer parameter maxCodeBlockGroupsPerTransportBlock for PUSCH.
PTRS-DMRS association - number of bits determined as follows
beta_offset indicator - 0 if the higher layer parameter dynamic in uci-on-PUSCH is not configured; otherwise 2 bits as defined by Table 7.3.1.1.2-27.
DMRS sequence initialization - 0 if the higher layer parameter PUSCH-tp=Enabled or 1 bit if the higher layer parameter PUSCH-tp=Disabled for $n_{SCID}$ selection defined in Subclause 7.4.1.1.1 of [4, TS38.211].

For grant-based transmission, PUSCH transmission is scheduled by DCI (e.g., DCI 0_0 and DCI 0_1 shown above). The PUSCH may be assigned (e.g., scheduled) by a DCI format 0_0/0_1 with CRC scrambled by C-RNTI, a new-RNTI (e.g., a first RNTI), TC-RNTI, or SP-CSI-RNTI. The new-RNTI may be called MCS-C-RNTI in specifications. Some UE-specific PUSCH parameters may be configured by RRC. An example for RRC configuration is shown in Listing 4. For example, pusch-AggregationFactor in PUSCH-Config indicates number of repetitions for data. When the UE 102 is configured with pusch-AggregationFactor>1, the same symbol allocation may be applied across the pusch-AggregationFactor consecutive slots and the PUSCH may be limited to a single transmission layer. The UE 102 may repeat the transport block (TB) across the pusch-AggregationFactor consecutive slots applying the same symbol allocation in each slot.

Listing 4

```
-- ASN1START
-- TAG-PUSCH-CONFIG-START
PUSCH-Config ::=                        SEQUENCE {
dataScramblingIdentityPUSCH             INTEGER (0..1023)
                                        OPTIONAL, -- Need M
txConfig                                ENUMERATED {codebook,
                                        nonCodebook}
                                        OPTIONAL, -- Need S
dmrs-UplinkForPUSCH-MappingTypeA        SetupRelease {
                                        DMRS-UplinkConfig }
                                        OPTIONAL, -- Need M
dmrs-UplinkForPUSCH-MappingTypeB        SetupRelease {
                                        DMRS-UplinkConfig }
                                        OPTIONAL, -- Need M
pusch-PowerControl                      PUSCH-PowerControl
                                        OPTIONAL, -- Need M
frequencyHopping                        ENUMERATED {mode1, mode2}
                                        OPTIONAL, -- Need S
frequencyHoppingOffsetLists             SEQUENCE (SIZE (1..4)) OF
                                        INTEGER (1.. maxNrofPhysicalResourceBlocks-1)
                                        OPTIONAL, -- Need M
resourceAllocation                      ENUMERATED {
                                        resourceAllocationType0,
                                        resourceAllocationType1,
                                        dynamicSwitch},
pusch-TimeDomainAllocationList          SetupRelease {
                                        PUSCH-TimeDomainResourceAllocationList }
                                        OPTIONAL, -- Need M
pusch-AggregationFactor                 ENUMERATED { n2, n4, n8 }
                                        OPTIONAL, -- Need S
mcs-Table                               ENUMERATED {qam256,
                                        spare1}
                                        OPTIONAL, -- Need S
mcs-TableTransformPrecoder              ENUMERATED {qam256,
                                        spare1}
                                        OPTIONAL, 7- Need S
transformPrecoder                       ENUMERATED {enabled,
                                        disabled}
                                        OPTIONAL, -- Need S
codebookSubset                          ENUMERATED {
                                        fullyAndPartialAndNonCoherent,
                                        partialAndNonCoherent,
                                        nonCoherent}
                                        OPTIONAL, -- Cond codebookBased
maxRank                                 INTEGER (1..4)
                                        OPTIONAL, -- Cond codebookBased
rbg-Size                                ENUMERATED {config2}
                                        OPTIONAL, -- Need S
uci-OnPUSCH                             SetupRelease {
                                        UCI-OnPUSCH}
                                        OPTIONAL, -- Need M
tp-pi2BPSK                              ENUMERATED {enabled}
                                        OPTIONAL, -- Need S
. . .
}
UCI-OnPUSCH ::=                         SEQUENCE {
betaOffsets                             CHOICE {
dynamic                                 SEQUENCE (SIZE (4)) OF
                                        BetaOffsets,
semiStatic                              BetaOffsets
}
                                        OPTIONAL, -- Need M
scaling                                 ENUMERATED { f0p5, f0p65,
                                        f0p8, f1 }
}
-- TAG-PUSCH-CONFIG-STOP
-- ASN1STOP
```

As mentioned above, retransmission of a configured grant (both Type 1 and Type 2) may be grant-based (e.g., PUSCH scheduled by PDCCH with CRC scrambled by CS-RNTI). Since RRC signaling may provide both configuration for configured grant (e.g., configuredGrantConfig IE) and configuration for grant-based PUSCH (e.g., PUSCH-Config IE), it should be determined which configuration the UE 102 should follow for the retransmission of a configured grant. For example, for a scheduled retransmission of a TB previously transmitted on a PUSCH with configured grant (e.g., Type 1, or Type 2, or both Type 1 and Type 2), the UE 102 may follow the configuration for a configured grant (e.g., configuredGrantConfig IE). In yet another example, for a scheduled retransmission of a TB previously transmitted on a PUSCH with configured grant (Type 1, or Type 2, or both Type 1 and Type 2), the UE may follow the configuration for grant-based PUSCH (e.g., PUSCH-Config IE). In yet another example, for a scheduled retransmission of a TB previously transmitted on a PUSCH with a configured grant (e.g., Type 1, or Type 2, or both Type 1 and Type 2), whether the UE 102 follows the configuration for a configured grant (e.g., configuredGrantConfig IE) or the configuration for grant-based PUSCH (e.g., PUSCH-Config IE) may be configurable.

In a design, if higher layer parameter (e.g., retx_config) is set as 'GB_PUSCH', or higher layer parameter (e.g., retx_config_PUSCH) is configured or configured as 'true', the UE 102 may follow the configuration for grant-based PUSCH (e.g., PUSCH-Config IE), otherwise, the UE 102 may follow the configuration for a configured grant (e.g., configuredGrantConfig IE). In yet another design, if higher layer parameter (e.g., retx_config) is set as 'CG_retx', or higher layer parameter (e.g., retx_config_CG) is configured or configured as 'true', the UE 102 may follow the configuration for a configured grant (e.g., configuredGrantConfig IE), otherwise, the UE 102 may follow the configuration for grant-based PUSCH (e.g., PUSCH-Config IE). In yet another example, for a scheduled retransmission of a TB previously transmitted on a PUSCH with a configured grant (e.g., Type 1, or Type 2, or both Type 1 and Type 2), the UE 102 may use some parameters from the configuration for configured grant (e.g., configuredGrantConfig IE) or may use some parameters from the configuration for grant-based PUSCH (e.g., PUSCH-Config IE).

For a scheduled retransmission of a TB previously transmitted on a PUSCH with a configured grant (e.g., Type 1, or Type 2, or both Type 1 and Type 2), when the UE 102 follows the configuration for configured grant, the UE 102 may only follow the set of parameters provided in configuredGrantConfig IE that are common to both a Type1 and Type2 configured grant (i.e., except those provided specifically for Type1 in rrc-ConfiguredUplinkGrant IE). For all other parameters not provided in configuredGrantConfig, including those in rrc-ConfiguredUplinkGrant, the UE 102 may follow the transmission configuration provided by the PUSCH-Config IE.

For a scheduled retransmission of a TB previously transmitted on a PUSCH with configured grant Type 1, when the UE 102 follows the configuration for a configured grant, the UE 102 may only follow the set of parameters provided in configuredGrantConfig IE that are common to both a Type1 and Type2 configured grant (i.e., except those provided specifically for Type1 in ac-ConfiguredUplinkGrant IE). For all other parameters not provided in configuredGrantConfig, including those in rrc-ConfiguredUplinkGrant, the UE 102 may follow the transmission configuration provided by the PUSCH-Config IE. In yet another design, when the UE 102 follows the configuration for a configured grant, the UE 102 may follow all the parameters provided in configuredGrantConfig IE including ac-ConfiguredUplinkGrant IE. In yet another design, when the UE 102 follows the configuration for configured grant, whether the UE 102 follows parameters in ac-ConfiguredUplinkGrant or not may be configurable.

For a scheduled retransmission of a TB previously transmitted on a PUSCH with a configured grant, whether the UE 102 follows the configuration for the configured grant (e.g., configuredGrantConfig IE) or the configuration for grant-based PUSCH (e.g., PUSCH-Config IE) may depend on the type of configured grant. For example, for a scheduled retransmission of a TB previously transmitted on a PUSCH with configured grant Type 1, the UE 102 may follow the configuration for the configured grant (e.g., configuredGrantConfig IE); for a scheduled retransmission of a TB previously transmitted on a PUSCH with configured grant Type 2, the UE 102 may follow the configuration for grant-based PUSCH (e.g., PUSCH-Config IE). In yet another example, for a scheduled retransmission of a TB previously transmitted on a PUSCH with configured grant Type 2, the UE 102 may follow the configuration for a configured grant (e.g., configuredGrantConfig IE); for a scheduled retransmission of a TB previously transmitted on a PUSCH with configured grant Type 1, the UE 102 may follow the configuration for grant-based PUSCH (e.g., PUSCH-Config IE).

For a scheduled retransmission of a TB previously transmitted on a PUSCH with a configured grant (e.g., Type 1, or Type 2, or both Type 1 and Type 2), whether the UE 102 follows the configuration for the configured grant (e.g., configuredGrantConfig IE) or the configuration for grant-based PUSCH (e.g., PUSCH-Config IE) may depend on the DCI format used for scheduling the retransmission. For example, for a scheduled retransmission of a TB previously transmitted on a PUSCH with a configured grant and the retransmission is scheduled by DCI format 0_0, the UE 102 may follow the configuration for the configured grant (e.g., configuredGrantConfig IE); for a scheduled retransmission of a TB previously transmitted on a PUSCH with a configured grant and the retransmission is scheduled by DCI format 0_1, the UE 102 may follow the configuration for grant-based PUSCH (e.g., PUSCH-Config IE). In yet another example, for a scheduled retransmission of a TB previously transmitted on a PUSCH with a configured grant and the retransmission is scheduled by DCI format 0_1, the UE 102 may follow the configuration for the configured grant (e.g., configuredGrantConfig IE); for a scheduled retransmission of a TB previously transmitted on a PUSCH with a configured grant and the retransmission is scheduled by DCI format 0_0, the UE 102 may follow the configuration for grant-based PUSCH (e.g., PUSCH-Config IE).

For a scheduled retransmission of a TB previously transmitted on a PUSCH with a configured grant (e.g., Type 1, or Type 2, or both Type 1 and Type 2), the UE 102 may use some parameters from the configuration for configured grant (e.g., configuredGrantConfig IE) or may use some parameters from the configuration for grant-based PUSCH (e.g., PUSCH-Config IE). Some examples are described herein. For the number of repetitions K applied to retransmission of a TB previously transmitted on a PUSCH with a configured grant (e.g., Type 1, or Type 2, or both Type 1 and Type 2), the UE 102 may use a parameter (e.g., repK) from the configuration for the configured grant (e.g., configuredGrantConfig IE). In yet another design, the UE 102 may use a parameter (e.g., pusch-AggregationFactor) from the configuration for grant-based PUSCH (e.g., PUSCH-Config IE). In yet another design, whether to use a parameter (e.g., repK) from the configuration for a configured grant (e.g., configuredGrantConfig IE) or a parameter (e.g., pusch-AggregationFactor) from the configuration for grant-based PUSCH (e.g., PUSCH-Config IE) may be configurable. For the redundancy version (RV) sequence applied to repetitions of retransmission for a configured grant (e.g., Type 1, or Type 2, or both Type 1 and Type 2), the UE 102 may use a parameter (e.g., repK-RV) from the configuration for the configured grant (e.g., configuredGrantConfig IE). In yet another design, the UE 102 may use {0, 2, 3, 1} as it is for grant-based PUSCH (e.g., PUSCH-Config IE). In yet another design, whether to use a parameter (e.g., repK-RV) from the configuration for the configured grant (e.g., configuredGrantConfig IE) or not may be configurable.

For the frequency domain resource configuration applied to retransmission of a TB previously transmitted on a PUSCH with a configured grant (e.g., Type 1, or Type 2, or both Type 1 and Type 2), the UE 102 may use a parameter (e.g., resourceAllocation) from the configuration for a configured grant (e.g., configuredGrantConfig IE). In yet another design, the UE 102 may use a parameter (e.g., resourceAllocation) from the configuration for grant-based PUSCH (e.g., PUSCH-Config IE). In yet another design, whether to use a parameter (e.g., resourceAllocation) from the configuration for a configured grant (e.g., configuredGrantConfig IE) or a parameter (e.g., resourceAllocation) from the configuration for grant-based PUSCH (e.g., PUSCH-Config IE) may be configurable. For the time domain resource configuration applied to retransmission of a TB previously transmitted on a PUSCH with a configured grant (e.g., Type 1, or Type 2, or both Type 1 and Type 2), the UE 102 may use a defaulted, predefined, and/or fixed time domain allocation list for the configured grant. In yet another design, the UE 102 may use a parameter (e.g., pusch-TimeDomainAllocationList), from the configuration for grant-based PUSCH (e.g., PUSCH-Config IE). In yet another design, whether to use a defaulted, predefined and/or fixed list for a configured grant (e.g., configuredGrantConfig IE) or a parameter (e.g., pusch-TimeDomainAllocationList) from the configuration for grant-based PUSCH (e.g., PUSCH-Config IE) may be configurable.

For some parameters (e.g., DMRS configuration (e.g., DMRS-UplinkConfig, DMRS type, sequence, position, length, identity, hopping), MCS table, frequency hopping mode and/or offset (e.g., frequencyHopping, frequencyHoppingOffset), UCI on PUSCH (e.g., uci-OnPUSCH, selection between and configuration of dynamic and semi-static beta-offset, scaling indicating a scaling factor to limit the number of resource elements assigned to UCI on PUSCH.), antenna port, power control (e.g., powerControlLoopToUse: closed control loop to apply, p0-PUSCH-Alpha: index of the P0-PUSCH-AlphaSet to be used for this configuration, alpha value for PUSCH, P0 value for PUSCH, a set of Reference Signals to be used for PUSCH path loss estimation, tpc-Accumulation indicating whether to enable TPC command via accumulation, number of PUSCH power control adjustment states maintained by the UE 102, a list of SRI-PUSCH-PowerControl elements among which one is selected by the SRI field in DCI, SRI-PUSCH-PowerControl), RBG size, time domain allocation, time domain offset, transform precoder, etc.) applied to retransmission of a TB previously transmitted on a PUSCH with configured grant (e.g., Type 1, or Type 2, or both Type 1 and Type 2), the UE 102 may use a parameter from the configuration for a configured grant (e.g., configuredGrantConfig IE). In yet another design, the UE 102 may use a parameter from the configuration for grant-based PUSCH (e.g., PUSCH-Config IE). In yet another design, whether to use a parameter the configuration for a configured grant (e.g., configuredGrantConfig IE) or a parameter from the configuration for grant-based PUSCH (e.g., PUSCH-Config IE) may be configurable.

For some parameters (e.g., time domain offset, time domain allocation, frequency domain allocation, antenna port, DMRS, power control, precoder, codebook, frequency hopping, frequency hopping offset, rank, number of layers, MCS, etc.) applied to retransmission of a TB previously transmitted on a PUSCH with a configured grant (e.g., Type 1, or Type 2, or both Type 1 and Type 2), these parameters may not be included in the configuration for a configured grant (e.g., configuredGrantConfig IE). The UE 102 may always use parameters from the configuration for grant-based PUSCH (e.g., PUSCH-Config IE).

PDCCH (DCI) used for activation/deactivation of UL transmission with configured grant (e.g., Type 2) may follow the configuration for a configured grant (e.g., configuredGrantConfig IE). For retransmission of a TB previously transmitted on a PUSCH with a configured grant (e.g., Type 1, or Type 2, or both Type 1 and Type 2), the UE 102 may use some parameter (e.g., resourceAllocation, pusch-TimeDomainAllocationList, etc.) from the configuration for grant-based PUSCH (e.g., PUSCH-Config IE). In this case, a PDCCH which is used to grant retransmission of a TB previously transmitted on a PUSCH with a configured grant may have a different DCI size (different length(s) for some DCI field(s), different position(s) of some DCI field(s)) compared to the PDCCH used for activation/deactivation of UL transmission with a configured grant. For example, selections of some parameters (e.g., resourceAllocation, pusch-TimeDomainAllocationList, etc.) may result in different length(s) of DCI filed(s) (e.g., Frequency domain resource assignment, Time domain resource assignment).

In order for alignment between a PDCCH used to grant retransmission of UL with a configured grant and a PDCCH used for activation/deactivation of UL transmission with a configured grant, some solutions are described herein. For some parameters (e.g., resourceAllocation, pusch-TimeDomainAllocationList, etc.) which may result in different length(s) and/or position(s) of DCI filed(s) (e.g., Frequency domain resource assignment, Time domain resource assignment, etc.), activation/deactivation of UL transmission with a configured grant and retransmission of UL with a configured grant may always follow the same configuration (e.g., either the configuration for configured grant (e.g., configuredGrantConfig IE) or the configuration for grant-based PUSCH (e.g., PUSCH-Config IE)). In yet another design, for some parameters (e.g., resourceAllocation, pusch-TimeDomainAllocationList, etc.) which may result in different length(s) and/or position(s) of DCI filed(s) (e.g., Frequency domain resource assignment, Time domain resource assignment, etc.), activation/deactivation of UL transmission with configured grant and retransmission of UL with a configured grant may follow different configurations (e.g., activation/deactivation may follow the configuration for configured grant (e.g., configuredGrantConfig IE) while retransmission may follow the configuration for grant-based PUSCH (e.g., PUSCH-Config IE)).

Length(s) and/or position(s) of DCI filed(s) may be fixed (as any value(s)) and/or set as one of the configurations (e.g., either the configuration for configured grant (e.g., configuredGrantConfig IE) or the configuration for grant-based PUSCH (e.g., PUSCH-Config IE)). Zero padding or truncation may be applied to some bit field(s) to fit in the corresponding DCI field(s) if there is a mismatch between length(s) of value(s)/parameter(s) derived from the configuration and fixed/defined length(s) of corresponding DCI field(s).

For the UL transmissions above, to determine the modulation order and target code rate, UE may read modulation and coding scheme (MCS) field ($I_{MCS}$) in the DCI (e.g., for grant-based transmission/retransmission, configured grant Type 2, retransmission of configured grant) or the RRC message (e.g., for configured grant Type 1). The MCS field may be used for indicating a row index ($I_{MCS}$) from a MCS table and used for determining the modulation order and/or the target code rate for the corresponding PUSCH (e.g., the corresponding PUSCH transmission).

There may be multiple tables targeted for different spectrum efficiency (SE) and/or reliability requirements. For a specific waveform (OFDM or DFT-s-OFDM), there may be one MCS table for high SE, one MCS table for normal SE and another MCS table for low SE. On the other hand, PUSCH transmission without transform precoding (PUSCH transmission with disabled transform precoder, OFDM) and PUSCH transmission with transform precoding (PUSCH transmission with enabled transform precoder, DFT-s-OFDM) may use different MCS tables.

In an example, for the case that a transform precoder is disabled (by RRC signaling, e.g., transformPrecoder in PUSCH-Config is set to 'disabled' or not configured), if high SE is configured by RRC for grant-based transmission and/or grant-free transmission, e.g., mcs-Table in PUSCH-Config is set to 'qam256' and/or mcs-Table in ConfiguredGrantConfig is set to 'qam256', high SE table (e.g., Table 1) and $I_{MCS}$ indicated by MCS field may be used for determining the modulation order and/or the target code rate for the corresponding PUSCH. If low SE is configured by RRC for grant-based transmission and/or grant-free transmission, e.g., mcs-Table in PUSCH-Config is set to 'qam64LowSE' and/or mcs-Table in ConfiguredGrantConfig is set to 'qam64LowSE', low SE table (e.g., Table 2) and $I_{MCS}$ indicated by MCS field may be used for determining the modulation order and/or the target code rate for the corresponding PUSCH. If normal SE is configured (or high SE and/or low SE is not configured) by RRC for grant-based transmission and/or grant-free transmission, e.g., mcs-Table in PUSCH-Config is set to 'qam64' (or mcs-Table is absent or not configured in PUSCH-Config) and/or mcs-Table in ConfiguredGrantConfig is set to 'qam64' (or mcs-Table is absent or not configured in ConfiguredGrantConfig), normal SE table (e.g. Table 3) and $I_{MCS}$ indicated by MCS field may be used for determining the modulation order and/or the target code rate for the corresponding PUSCH.

For the case that transform precoder is enabled (by RRC signaling, e.g., transformPrecoder in PUSCH-Config is set to 'enabled' or msg3-transformPrecoding in rachConfig-Common is set to 'enabled'), if high SE is configured by RRC for grant-based transmission and/or grant-free transmission, e.g., mcs-TableTransformPrecoder in PUSCH-Config is set to 'qam256' and/or mcs-TableTransformPrecoder in ConfiguredGrantConfig is set to 'qam256', high SE table (e.g., Table 1) and $I_{MCS}$ indicated by MCS field may be used for determining the modulation order and/or the target code rate for the corresponding PUSCH. If low SE is configured by RRC for grant-based transmission and/or grant-free transmission, e.g., mcs-TableTransformPrecoder in PUSCH-Config is set to 'qam64LowSE' and/or mcs-TableTransformPrecoder in ConfiguredGrantConfig is set to 'qam64LowSE', low SE table (e.g. Table 4) and $I_{MCS}$ indicated by MCS field may be used for determining the modulation order and/or the target code rate for the corresponding PUSCH. If normal SE is configured (or high SE and/or low SE is not configured) by RRC for grant-based transmission and/or grant-free transmission, e.g., mcs-TableTransformPrecoder in PUSCH-Config is set to 'qam64' (or mcs-TableTransformPrecoder is absent or not configured in PUSCH-Config) and/or mcs-TableTransformPrecoder in ConfiguredGrantConfig is set to 'qam64' (or mcs-TableTransformPrecoder is absent or not configured in ConfiguredGrantConfig), normal SE table (e.g., Table 5) and $I_{MCS}$ indicated by MCS field may be used for determining the modulation order and/or the target code rate for the corresponding PUSCH.

For Table 4 and Table 5, the value of q may depend on whether t/2-BPSK is used or not. For example, if t/2-BPSK is configured by RRC (e.g., higher layer parameter tppi2BPSK is configured and/or set as 'enabled' in IE PUSCH-Config) for PUSCH, q=1 otherwise q=2. RNTI(s) (e.g., the RNTI described above) may also impact the selection of MCS table. For example, for PUSCH scheduled by PDCCH with CRC scrambled by TC-RNTI, normal SE may be always assumed and corresponding normal SE MCS table (as in the examples mentioned above) is used. For PUSCH scheduled by PDCCH with CRC scrambled with CS-RNTI, the MCS table may be determined based on the RRC configuration for configure grant (e.g., MCS table indicated by mcs-Table or mcs-TableTransformPrecoder in ConfiguredGrantConfig). For PUSCH scheduled by PDCCH with CRC scrambled by new-RNTI, low SE may be always assumed and a corresponding low SE MCS table (as in the examples mentioned above) is used.

TABLE 1

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 2

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | reserved |
| 30 | 4 | | reserved |
| 31 | 6 | | reserved |

TABLE 3

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | reserved |
| 30 | 4 | | reserved |
| 31 | 6 | | reserved |

TABLE 4

| MCS Index $I_{MCS}$ | Modulation Order $Q_m$ | Target code Rate R × [1024] | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | | reserved |
| 29 | 2 | | reserved |
| 30 | 4 | | reserved |
| 31 | 6 | | reserved |

TABLE 5

| MCS Index $I_{MCS}$ | Modulation Order $Q_m$ | Target code Rate R × [1024] | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | | reserved |
| 29 | 2 | | reserved |
| 30 | 4 | | reserved |
| 31 | 6 | | reserved |

In NR, the UE 102 may support multiple types of DL transmissions (PDSCH transmissions), such as dynamic DL transmissions (PDSCH transmissions scheduled by PDCCH, PDSCH transmission scheduled by DCI, e.g., DCI format 1_0, DCI format 1_1) and Semi-Persistent Scheduling (SPS) PDSCH transmissions. Semi-Persistent Scheduling (SPS) may be configured by RRC (i.e., by using the RRC message) and a DL assignment is provided by PDCCH, and stored and/or cleared based on L1 signaling (i.e., PDCCH, DCI format(s)) indicating SPS activation or deactivation. For DL SPS, some parameters (e.g., CS-RNTI, periodicity, number of HARQ processes) may be configured by RRC and the remaining parameters (e.g., time domain resource allocation, frequency domain resource allocation) may be provided by PDCCH activation. PDCCH used for activation, deactivation, and retransmission of DL SPS may have CRC scrambled with CS-RNTI.

For dynamic DL transmission, PDSCH transmission may be scheduled by DCI (e.g., DCI 1_0 and DCI 1_1). The PDSCH may be assigned by a DCI format 1_0/1_1 with CRC scrambled by C-RNTI, new-RNTI, TC-RNTI, CS-RNTI, SI-RNTI, RA-RNTI, or P-RNTI.

For the DL transmissions as described above, to determine the modulation order and/or the target code rate (e.g., for the corresponding PDSCH transmission), the UE 102 may read a modulation and coding scheme (MCS) field ($I_{MCS}$) in the DCI (for transmission/retransmission/activation). The MCS field may be used for indicating a row index ($I_{MCS}$) from a MCS table and used for determining the modulation order and/or the target code rate for the corresponding PDSCH.

There may be multiple tables targeted for different spectrum efficiency (SE) and/or reliability requirements. There may be one MCS table for high SE, one MCS table for normal SE and another MCS table for low SE. In an example, if high SE is configured by RRC for PDSCH transmission (e.g., mcs-Table in PDSCH-Config is set to 'qam256' or mcs-Table in SPS-config is set to 'qam256'), high SE table (e.g., Table 1) and $I_{MCS}$ indicated by MCS field may be used for determining the modulation order and/or the target code rate for the corresponding PDSCH. If low SE is configured by RRC for PDSCH transmission (e.g., mcs-Table in PDSCH-Config is set to 'qam64LowSE' and/or mcs-Table in SPS-config is set to 'qam64LowSE'), low SE table (e.g., Table 2) and $I_{MCS}$ indicated by MCS field may be used for determining the modulation order and/or the target code rate for the corresponding PDSCH. If normal SE is configured (or high SE and/or low SE is not configured) by RRC for PDSCH (e.g., mcs-Table in PDSCH-Config is set to 'qam64' (or mcs-Table is absent or not configured in PDSCH-Config) and/or mcs-Table in SPS-config is set to 'qam64' (or mcs-Table is absent or not configured in SPS-config)), normal SE table (e.g. Table 3) and $I_{MCS}$ indicated by MCS field may be used for determining the modulation order and/or the target code rate for the corresponding PDSCH.

RNTI(s) (e.g., the RNTI(s) described above) may also impact the selection of MCS table. For example, for PDSCH scheduled by PDCCH with CRC scrambled by TC-RNTI, SI-RNTI, RA-RNTI, or P-RNTI, normal SE may be always assumed and corresponding normal SE MCS table (e.g., as in the examples mentioned above) is used. For PDSCH with CRC scrambled with CS-RNTI, the MCS table may be determined based on the RRC configuration for SPS (e.g., MCS table indicated by mcs-Table in SPS-config). For PDSCH scheduled by PDCCH with CRC scrambled by new-RNTI, low SE may be always assumed and corresponding low SE MCS table (e.g., as in the examples mentioned above) is used. DCI format may also impact the selection of MCS table. For example, for PDSCH scheduled by fallback DCI (e.g., DCI 1_0), normal SE may be always assumed and corresponding normal SE MCS table (e.g., as in the examples mentioned above) is used.

In NR, it is allowed that a PDSCH transmission can be pre-empted by another PDSCH transmission. The impacted UE 102 can be configured by RRC (e.g., the UE 102 is provided higher layer parameter DownlinkPreemption) to monitor PDCCH conveying DCI (e.g., DCI format 2_1) which indicates the pre-empted part (e.g., time domain and/or frequency domain resource impacted by pre-emption from another transmission). In this case, the impacted UE 102 may assume that there is no transmission intended for it in the indicated pre-empted part (e.g., there is no transmission to the UE 102).

An example of RRC configuration for DL pre-emption is shown in Listing 5 and/or UL pre-emption is shown in Listing 6. Here, a parameter (e.g., a higher layer parameter (e.g., a parameter(s) configured by using a RRC message)) "DownlinkPreemption" may be a configuration(s) of downlink preemption indication(s) to be monitored in a serving cell (e.g., a corresponding serving cell, a concerned serving cell). Also, a parameter (e.g., a higher layer parameter (e.g., a parameter(s) configured by using a RRC message)) "UplinkPreemption" may be a configuration(s) of uplink preemption indication(s) to be monitored in a serving cell (e.g., a corresponding serving cell, a concerned serving cell) and/or UL bandwidth part(s) (e.g., a corresponding UL BWP(s), a concerned UL BWP(s)). If a UE 102 is provided higher layer parameter DownlinkPreemption, the UE 102 may be configured with an INT-RNTI provided by higher layer parameter int-RNTI for monitoring PDCCH conveying DCI format 2_1.

The UE 102 may be additionally configured with: a set of serving cells by higher layer parameter INT-ConfigurationPerServingCell that includes a set of serving cell indexes provided by corresponding higher layer parameters servingCellId and a corresponding set of locations for fields in DCI format 2_1 by higher layer parameter positionInDCI; an information payload size for DCI format 2_1 by higher layer parameter dci-PayloadSize; an indication granularity for time-frequency resources by higher layer parameter timeFrequencySet. A set of bandwidth parts (BWPs) may be configured by higher layer parameter (e.g., INT-ConfigurationPerBWP) that includes a set of BWP indexes/sizes provided by corresponding higher layer parameters (e.g., BWPId, BWPsize) and a corresponding set of locations for fields in DCI format 2_1 by higher layer parameter (e.g., BWPpositionInDCI). If a UE 102 detects a DCI format 2_1 for a serving cell from the configured set of serving cells, the UE 102 may assume that no transmission to the UE 102 is present in PRBs and in symbols, from a set of PRBs and a set of symbols of the last monitoring period, that are indicated by the DCI format 2_1. The indication by the DCI format 2_1 is not applicable to receptions of SS/PBCH blocks.

Listing 5

```
-- ASN1START
-- TAG-DOWNLINKPREEMPTION-START
DownlinkPreemption ::=            SEQUENCE {
int-RNTI                          RNTI-Value,
```

Listing 5

```
timeFrequencySet                    ENUMERATED {set0, set1},
dci-PayloadSize                     INTEGER (0..maxINT-DCI-PayloadSize),
int-ConfigurationPerServingCell     SEQUENCE (SIZE (1..maxNrofServingCells)) OF
INT-ConfigurationPerServingCell,
...
}
INT-ConfigurationPerServingCell ::= SEQUENCE {
servingCellId                       ServCellIndex,
positionInDCI                       INTEGER (0..maxINT-DCI-PayloadSize-1)
}
-- TAG-DOWNLINKPREEMPTION-STOP
-- ASN1STOP
```

In the DownlinkPreemption field of Listing 5, dci-PayloadSize is the total length of the DCI payload scrambled with INT-RNTI. int-ConfigurationPerServingCell indicates (per serving cell) the position of the 14 bit INT values inside the DCI payload. int-RNTI is the RNTI used for pre-emption indication in DL (e.g., int-RNTI is used to scramble the CRC of PDCCH containing pre-emption indication). timeFrequencySet is the set (e.g., a group of time/frequency resources which may be pre-empted) selection for DL-preemption indication. The set determines how the UE 102 interprets the DL preemption DCI payload.

In the INT-ConfigurationPerServingCell field of Listing 5, positionInDCI is the starting position (in number of bit) of the 14 bit INT value applicable for this serving cell (e.g., servingCellId) within the DCI payload. Must be multiples of 14 (bit).

Listing 6

```
-- ASN1START
-- TAG-UPLINKPREEMPTION-START
UplinkPreemption ::=                SEQUENCE {
int-UL-RNTI                         RNTI-Value,
timeErequencySet_UL                 ENUMERATED {set0, set1},
dci-PayloadSize_UL                  INTEGER (0..maxINT-DCI-PayloadSize),
int-ConfigurationPerServingCell_UL  SEQUENCE (SIZE (1..maxNrofServingCells)) OF
INT-ConfigurationPerServingCell,
...
}
INT-Configuration-UL ::= SEQUENCE {
servingCellId                       ServCellIndex,
ulbwpIf                             bwp_id
positionInDCI                       INTEGER (0..maxINT-DCI-PayloadSize-1)
}
-- TAG-UPLINKPREEMPTION-STOP
-- ASN1STOP
```

In the UplinkPreemption field of Listing 6, dci-PayloadSize is the total length of the DCI payload scrambled with INT-UL-RNTI. int-Configuration-UL indicates (per serving cell and/or per UL BWP) the position of the X bit INT values inside the DCI payload. int-UL-RNTI is the RNTI used for pre-emption indication in UL (e.g., int-UL-RNTI is used to scramble the CRC of PDCCH containing pre-emption indication). timeFrequencySet is the set (e.g., a group of time/frequency resources which may be pre-empted) selection for UL-preemption indication. The set determines how the UE interprets the UL preemption DCI payload.

In the INT-Configuration-UL field of Listing 6, positionInDCI is the starting position (in number of bit) of the X bit INT value applicable for this serving cell (e.g., servingCellId) and/or this UL BWP (e.g., bwp_id) within the DCI payload. Must be multiples of X (bit).

An example of pre-emption indication DCI (i.e., DCI 2_1) is also described herein. DCI format 2_1 may be used for notifying (e.g., indicating) the PRB(s) and/or OFDM symbol(s) where the UE 102 may assume no transmission is intended for the UE 102. The following information is transmitted by means of the DCI format 2_1 with CRC scrambled by INT-RNTI (and/or INT-UL-RNTI): Pre-emption indication 1, Pre-emption indication 2, . . . , Pre-emption indication N.

The size of DCI format 2_1 (i.e., the number of bits for DCI format 2_1) may be configurable by higher layers up to 126 bits. Each pre-emption indication is 14 bits. The bits of pre-emption indication field may have a one-to-one mapping with predefined/selected time/frequency resources. A bit value of 0 (or 1) may indicate transmission to the UE 102 (and/or transmission from the UE 102) in the corresponding time/frequency domain resource, and a bit value of 1 (or 0) may indicate no transmission to the UE 102 (and/or no transmission from the UE 102) in the corresponding time/frequency domain resource. The one-to-one mapping may depend on the value of timeFrequencySet. The one-to-one mapping may also depend on the BWP (e.g., BWP identification, BWP size, BWP index, BWP position). Namely, the time/frequency sets that include pre-defined potential pre-empted parts (time/frequency resources potentially impacted by pre-emption) may be different in different BWPs. A set of PDCCH candidates for a UE 102 to monitor is defined in terms of PDCCH search space sets. A search space set(s) (e.g., a search space(s)) can be a common search space set(s) (e.g., a common search space(s)) or a UE-specific search space set(s) (e.g., UE-specific search space(s)).

A UE 102 may monitor PDCCH conveying DCI format 2_1 in the common search space set and/or the UE-specific search space. For example, the UE 102 may monitor PDCCH candidates in one or more of the following search spaces sets: a Type1-PDCCH common search space set configured by ra-SearchSpace (e.g., a higher layer parameter) for a DCI format(s) with CRC scrambled by a RA-RNTI, and/or a TC-RNTI; a Type3-PDCCH common search space set configured by SearchSpace (e.g., a higher layer parameter) with searchSpaceType=common for a DCI format(s) with CRC scrambled by INT-RNTI, INT-UL-RNTI, C-RNTI, and/or CS-RNTI(s); and a UE-specific search space set configured by SearchSpace (e.g., the higher layer parameter) with searchSpaceType=ue-Specific for a DCI format(s) with CRC scrambled by C-RNTI, or CS-RNTI(s).

Also, for example, for each DL BWP configured to a UE in a serving cell, the UE is provided by a higher layer parameter with S≤10 search space sets where, for each search space set from the S search space sets, the UE 102 may be provided one or more of the following by a higher layer parameter SearchSpace; a search space set index s, 0≤s<40, by a higher layer parameter searchSpaceId; an association between the search space set s and a control resource set p by a higher layer parameter controlResourceSetId; a PDCCH monitoring periodicity of $k_{p,s}$ slots and a PDCCH monitoring offset of $o_{p,s}$ slots, by a higher layer parameter monitoringSlotPeriodicityAndOffset; a PDCCH monitoring pattern within a slot, indicating first symbol(s) of the control resource set within a slot for PDCCH monitoring, by a higher layer parameter monitoringSymbolsWithinSlot; a number of PDCCH candidates $M_{p,s}^{(L)}$ per CCE aggregation level L by a higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively; an indication that search space set s is either a common search space set or a UE-specific search space set by a higher layer parameter searchSpaceType.

If the search space set s is a common search space set, then the UE 102 is provided the following by a higher layer parameter SearchSpace: an indication by higher layer parameter dci-Format0-0-AndFormat1-0 to monitor PDCCH candidates for DCI format 0_0 and DCI format 1_0 with CRC scrambled by a C-RNTI, a CS-RNTI, RA-RNTI, and/or TC-RNTI; an indication by higher layer parameter dci-Format2-1 to monitor PDCCH candidates for DCI format 2_1; an indication by a higher layer parameter dci-Format2-1-INT-RNTI to monitor PDCCH candidates for DCI format 2_1 with CRC scrambled by INT-RNTI; and/or an indication by a higher layer parameter dci-Format2-1-INT-UL-RNTI to monitor PDCCH candidates for DCI format 2_1 with CRC scrambled by INT-UL-RNTI.

If the search space set s is a UE-specific search space set, then the UE 102 is provided the following by a higher layer parameter SearchSpace: an indication by a higher layer parameter dci-Formats to monitor PDCCH candidate either for DCI format 0_0 and DCI format 1_0, or for DCI format 0_1 and DCI format 1_1.

Here, the UE 102 may determine a PDCCH monitoring occasion(s) from the PDCCH monitoring periodicity, the PDCCH monitoring offset, and/or the PDCCH monitoring pattern within a slot. As described above, for example, for each search space set, DCI format 2_1 with CRC scrambled by INT-RNTI and/or DCI format 2_1 with CRC scrambled by INT-UL-RNTI may be independently configured. For example, the PDCCH monitoring occasion(s) may be independently configured for DCI format 2_1 with CRC scrambled by INT-RNTI and/or DCI format 2_1 with CRC scrambled by INT-UL-RNTI.

Here, for each search space set, DCI format 2_1 with CRC scrambled by INT-RNTI and/or DCI format 2_1 with CRC scrambled by INT-UL-RNTI maybe commonly configured. For example, the PDCCH monitoring occasion(s) may be commonly configured for DCI format 2_1 with CRC scrambled by INT-RNTI and/or DCI format 2_1 with CRC scrambled by INT-UL-RNTI. For example, the gNB 160 may configure for the UE 102 to monitor the PDCCH candidates for the DCI format 2_1, and, the UE 102 may monitor, based on the parameter(s) as described above, both of the DCI format 2_1 with CRC scrambled by INT-RNTI and the DCI format 2_1 with CRC scrambled by INT-UL-RNTI.

Also, if search space set is a common search space set, an indication may be configured by a higher layer parameter dci-Format2-1* to monitor the PDCCH candidates for DCI format 2_1* (as descried below). For example, if the gNB 160 may configure for the UE 102 to monitor the PDCCH candidates for the DCI format 2_1, and, the UE 102 may monitor, based on the parameter(s) as described above, the DCI format 2_1 with CRC scrambled by INT-RNTI. Also, the gNB 160 may configure the UE 102 to monitor the PDCCH candidates for DCI format 2_1*, and, the UE 102 may monitor, based on the parameter(s) as described above, DCI format 2_1* with CRC scrambled by INT-RNTI or INT-UL-RNTI.

In NR, it may be also allowed that a PUSCH transmission can be pre-empted (interrupted, punctured, rate-matched, overridden, superposed) by another PUSCH transmission of the same UE 102 (intra-UE) or a different UE 102 (inter-UE). The impacted UE 102 may be indicated (by RRC, MAC CE, L1 signaling (e.g., PDCCH, DCI format(s)), or any combination of above) whether/where (in which symbol(s) and/or PRB(s)) there is pre-emption(s).

With the pre-emption information, the UE behavior may be defined. For example, the UE 102 may assume that no transmission (e.g., no transmission from the UE) is allowed for the impacted PUSCH in the indicated part(s) and/or the impacted PUSCH transmission may avoid the indicated part(s) by puncturing, rate-matching or pausing (and then resuming). In yet another example, the UE 102 may abandon (e.g., omit, skip, drop, withdraw, postpone, cancel) the impacted PUSCH and/or the corresponding grant. In yet another example, the UE 102 may keep transmitting the PUSCH as usual. Namely, the UE 102 may perform no transmission in the corresponding part (e.g., the pre-empted part) or the whole PUSCH resource. For example, DCI format 2_1 (and/or DCI format 2_1*) may be used for notifying (e.g., indicating) the corresponding part (e.g., the PRB(s) and/or OFDM symbol(s)) where the UE 102 may perform no transmission. Also, DCI format 2_1 (and/or DCI format 2_1*) may be used for notifying the corresponding part (e.g., the PRB(s) and/or OFDM symbol(s)) where the UE 102 may perform transmission. In the following, as one example, no transmission is performed by the UE 102 is described.

The UE 102 may be configured by RRC (e.g., the UE 102 is provided higher layer parameter UplinkPreemption) to monitor PDCCH conveying DCI (e.g., DCI format 2_1 and/or DCI format 2_1*) which indicates the presence of pre-emption (e.g., 1-bit indication) and/or the pre-empted part (e.g., time domain and/or frequency domain resource impacted by pre-emption from another transmission).

Here, for example, the parameter(s) "DownlinkPreemption" and the parameter(s) "UplinkPreemption" may be independently (e.g., separately) configured to the UE 102. For example, the parameter(s) "DownlinkPreemption" may be configured per serving cell. Namely, the parameter(s) "DownlinkPreemption" may be configured for each of the primary cell and the one or more secondary cell. Here, the parameter "DownlinkPreemption" may be configured per serving cell, but association with each DL BWP may be needed. Also, the parameter(s) "DownlinkPreemption" may be configured per DL BWP. Namely, the parameter(s) "DownlinkPreemption" may be configured for each of DL BWPs (e.g., each of DL BWPs in a serving cell). Also, for example, the parameter(s) "UplinkPreemption" may be configured per serving cell. Namely, the parameter(s) "UplinkPreemption" may be configured for each of the primary cell and the one or more secondary cell. Here, the parameter "UplinkPreemption" may be configured per serving cell, but association with each UL BWP may be needed. Also, the parameter(s) "UplinkPreemption" may be configured per UL BWP. Namely, the parameter(s) "UplinkPreemption" may be configured for each of UL BWPs (e.g., each of one or more UL BWPs in a serving cell). For example, the parameter(s) "DownlinkPreemption" may be configured for each of serving cells (e.g., the primary cell and the one or more secondary cells, DL component carrier(s), DL serving cell(s)), and the parameter(s) "UplinkPreemption" may be configured for each of UL BWPs (e.g., one or more UL BWPs in a serving cell).

If a UE 102 is provided higher layer parameter (e.g., UplinkPreemption), the UE 102 may be configured with an RNTI (e.g., INT-UL-RNTI) provided by higher layer parameter (e.g., int-ul-RNTI) for monitoring PDCCH conveying DCI (e.g., DCI format 2_1, and/or DCI format 2_1*) which indicates pre-emption information. Namely, a single DCI format (e.g., DCI format 2_1) may be defined for notifying the corresponding part (e.g., the PRB(s) and/or the OFDM symbols(s)) where the UE 102 assumes no transmission to the UE 102 and notifying the corresponding part (e.g., the PRB(s) and/or the OFDM symbol(s) where the UE 102 performs no transmission from the UE 102). For example, as described above, based on the RNTI (e.g., INT-RNTI or INT-UL-RNTI), the UE 102 may identify that whether the single DCI format is used for notifying of the corresponding DL part (i.e., the corresponding part where the UE 102 assumes no transmission to the UE 102) or the corresponding UL part (i.e., the corresponding part where the UE 102 performs no transmission from the UE 102).

Also, the RNTI (e.g., INT-UL-RNTI) may be the same as INT-RNTI for DL pre-emption mentioned above, or the single RNTI is commonly configured for both UL preemption and DL pre-emption. Namely, the single RNTI (e.g., INT-RNTI) may be configured for identification of pre-emption in the downlink and/or the uplink.

Furthermore, the DCI format 2_1 with CRC scrambled by INT-RNTI may be used for notifying the corresponding DL part. Also, the DCI format 2_1* with CRC scrambled by INT-RNTI may be used for notifying the corresponding UL part.

In yet another design, the RNTI may be different from the INT-RNTI for DL pre-emption mentioned above, or the RNTI is independently configured for UL pre-emption. Also, the DCI format 2_1* with CRC scrambled by INT-UL-RNTI may be defined for notifying the corresponding UL part.

If a UE 102 is provided with a higher layer parameter (e.g., RRC IE UplinkPreemption), the UE 102 may be additionally configured with: a set of serving cells by higher layer parameter (e.g., INT-ConfigurationPerServingCell) that includes a set of serving cell indexes provided by corresponding higher layer parameters (e.g., servingCellId) and a corresponding set of locations for fields in pre-emption indication DCI (e.g., DCI format 2_1*) by higher layer parameter (e.g., positionInDCI); an information payload size for pre-emption indication DCI (e.g., DCI format 2_1*) by higher layer parameter (e.g., dci-PayloadSize); an indication granularity for time-frequency resources by higher layer parameter (e.g., timeFrequencySet).

UE behavior (e.g., puncturing, rate-matching, pausing-resuming, abandoning, cancelling, dropping) may also be configured by a higher layer parameter (e.g., UEBehavior). A set of bandwidth parts (BWPs) may be configured by higher layer parameter (e.g., INT-ConfigurationPerBWP) that includes a set of BWP indexes/sizes provided by corresponding higher layer parameters (e.g., BWPId, BWPsize) and a corresponding set of locations for fields in pre-emption indication DCI (e.g., DCI format 2_1*) by higher layer parameter (e.g., BWPpositionInDCI).

Pre-emption indication DCI (e.g., DCI 2_1*) for UL pre-emption is also described herein. As described above, the DCI format (e.g., DCI format 2_1*) may be used for notifying the PRB(s) and OFDM symbol(s) where a UE 102 may assume the PUSCH is pre-empted (interrupted, punctured, rate-matched, overridden, superposed, cancelled, dropped) or no transmission is intended/allowed for the UE 102 (i.e., the UE 102 may perform no transmission from the UE 102). Or, the DCI format (e.g., DCI format 2_1*) may be used for notifying whether the UE 102 is impacted or not. A pre-emption indication may also be referred to as a cancelation indication since the UE 102 may cancel (part(s) of) the corresponding PUSCH transmission after receiving the information provided by the pre-emption indication (e.g., the UE 102 may be indicated by gNB 160 to cancel part or whole of a previously scheduled UL transmission(s)). In yet another design, a pre-emption indication may also include information (e.g., continuation indication) indicating where/when the UE 102 may continue/resume the pre-empted, impacted, interrupted, punctured, superposed, cancelled and/or dropped UL transmission (e.g., the UE 102 may be indicated by the gNB 160 to continue or stop a previously scheduled UL transmission). In yet another design, a pre-emption indication may also include information (e.g., re-scheduling indication) indicating re-scheduling of the pre-empted, impacted, interrupted, punctured, superposed, cancelled and/or dropped UL transmission (e.g., the UE 102 may be indicated by a re-scheduling grant or indication to cancel a previously scheduled UL transmission and start another UL transmission on a different time/frequency resource).

A pre-emption indication (PI) DCI format (e.g., DCI format 2_1) for UL pre-emption may be the same as the PI DCI format for DL pre-emption mentioned above (e.g., the following information is transmitted by means of the DCI format: Pre-emption indication 1, Pre-emption indication 2, . . . , Pre-emption indication N), or UL PI DCI and DL PI DCI may use the same DCI format but there is 1-bit information in the DCI format to differentiate DL and UL (e.g., the following information is transmitted by means of the DCI format: UL/DL differentiation, Pre-emption indication 1, Pre-emption indication 2, . . . , Pre-emption indication N). Namely, the single DCI format (e.g., DCI format 2_1) and the single RNTI (e.g., INT-RNTI) may be defined (e.g., configured) for notifying the corresponding DL part and/or the corresponding UL part.

And, for example, based on the information (e.g., 1-bit identifier, 1-bit DCI) included in the single DCI format, the UE 102 may identify that whether the single DCI format (and/or the single RNTI) is used for notifying of the corresponding DL part or the corresponding UL part. Namely, based on the information (e.g., 1-bit identifier, 1-bit DCI), the UE 102 may identify that whether the information (e.g., DCI) included in the single DCI format is used for indicating the corresponding DL part or the corresponding UL part. For example, the information (e.g., 1-bit identifier, 1-bit DCI) may be used for identifying DCI format(s) (e.g., DCI format used for indicating the corresponding DL part or DCI format used for indicating the corresponding UL part). Here, the first field of the fields (e.g., the field at the beginning of the fields) defined in the DCI format may be mapped to the information (e.g., 1-bit identifier, 1-bit DCI).

The bits of Pre-emption indication field may have a one-to-one mapping with predefined/selected time/frequency resources. A bit value of 0 (or 1) may indicate that transmission is allowed from the UE 102 (e.g., the UE perform transmission) in the corresponding time/frequency domain resource, and a bit value of 1 (or 0) may indicate that no transmission is allowed from the UE 102 (e.g., the UE 102 may perform no transmission) in the corresponding time/frequency domain resource (i.e., the corresponding part).

The one-to-one mapping may depend on the value of higher layer parameter (e.g., timeFrequencySet). The one-to-one mapping may also depend on the BWP (e.g., BWP identification, BWP size, BWP index, BWP position). Namely, the time/frequency sets which include pre-defined potential pre-empted parts (time/frequency resources potentially impacted by pre-emption) may be different in different BWPs.

In yet another design, PI DCI format (e.g., DCI format 2_1* ) for UL pre-emption may be the different from the PI DCI format (e.g., DCI format 2_1) for DL pre-emption, as mentioned above. For example, the pre-emption indication field in UL PI DCI may have a different indication granularity and/or a different length (e.g., 2, 4, 7 symbols) comparing to the pre-emption indication field in DL PI DCI. Namely, the gNB 160 may independently configure, by using a higher layer parameter(s), the granularity and/or the length for the corresponding DL part and the corresponding UL part. In yet another example, the pre-emption indication field in UL PI DCI may be just a 1-bit information indication whether the corresponding transmission is impacted or not.

The UL PI DCI format may be conveyed by PDCCH with CRC scrambled by the RNTI(s) used for monitoring pre-emption information. A UE 102 may monitor PDCCH conveying UP PI DCI format in a common search space set and/or a UE-specific search space set.

If a UE 102 detects a UL PI DCI format(s) (e.g., DCI format 2_1, DCI format 2_1*, DCI format 2_1 with CRC scrambled by INT-RNTI and/or INT-UL-RNTI, DCI format 2_1* with CRC scrambled by INT-RNTI and/or INT-UL-RNTI, and/or DCI format identified by the information (e.g., 1-bit identifier, 1-bit DCI)) for a serving cell (e.g., and/or a UL BWP) from the configured set of serving cells (e.g., and/or the configured set of UL BWPs), the UE 102 may assume that the PUSCH is pre-empted (interrupted, punctured, rate-matched, overridden, superposed, cancelled and/or dropped) or no transmission from the UE is present in PRBs and in symbols, from a set of PRBs and a set of symbols of the last monitoring period, that are indicated by the UL PI. The UE 102 may take action (e.g., avoid and/or skip the pre-empted part(s) by puncturing, rate-matching, pausing-resuming, abandoning, cancelling and/or dropping) by a fixed/pre-defined rule or by following RRC message (e.g., higher layer parameter UEBehavior).

UE monitoring behavior for the UL pre-emption indication (cancelation/continuation/re-scheduling indication) is also described herein. The UE 102 may monitor a pre-emption indication periodically. The monitoring occasions may be determined by higher layer parameters (e.g., periodicity, offset, bitmap) or indicated by L1 signaling. The UE monitoring periodicity may be slot-based, mini-slot-based or symbol-based. To enable a timely cancellation, dropping and/or stopping, the UE monitoring periodicity may be less than a slot (e.g., from 1 symbol to 13 symbols).

In yet another design, the UE 102 may only be required to monitor the UL pre-emption indication for UL cancelation, continuation, and/or re-scheduling after a UL grant is detected until the corresponding UL transmission has been finished. Some methods to determine the monitoring occasion are described herein. For example, the monitoring occasion may be determined by the timing of the UL grant or the timing of the corresponding UL transmission. The time difference between the UL grant and the monitoring occasion is denoted by T1. The time difference between the monitoring occasion and the corresponding UL transmission (e.g., beginning or end of the allocated PUSCH resource) is denoted by T2. T1 and/or T2 may be in a unit of slot, mini-slot or symbol.

In some implementations, T1 and/or T2 may be fixed in the specifications, indicated by L1 signaling (e.g., the UL grant or other L1 signaling), or configured by RRC. In other implementations, a set of values of T1 and/or T2 may be configured by RRC and L1 signaling may indicate the selection of T1 and/or T2. In other implementations, T2 may be determined by the PUSCH preparation time $T_{proc,2}$ for the corresponding PUSCH processing capability (e.g., T2=$T_{proc,2}$+offset_PI, where offset_PI may be any value (e.g., 0, positive value or negative value) and offset_PI may be fixed in the specification, indicated by L1 signaling, configured by RRC, or any combination of above). In yet other implementations, T2 may be determined by the UE processing time $T_{proc,PI}$ for the indication of UL pre-emption, cancelation, continuation and/or rescheduling (e.g., T2=. $T_{proc,PI}$+offset_proc_PI, where offset_proc_PI may be any value (e.g., 0, positive value or negative value) and offset_proc_PI may be fixed in the specification, indicated by L1 signaling, configured by RRC, or any combination of above).

In yet another example, the monitoring occasion may be determined by a bitmap. Each bit of the bitmap may have a one-to-one mapping to each slot, mini-slot and/or symbol between the UL grant and the corresponding UL transmission (e.g., beginning or end of the allocated PUSCH resource). If a bit of the bitmap indicates "1" (or "0"), the UE 102 may monitor the pre-emption indication at the corresponding slot, mini-slot and/or symbol, otherwise, the UE 102 may not monitor the pre-emption indication at the corresponding slot, mini-slot and/or symbol.

Whether to monitor pre-emption indication or not may be configurable (by RRC, for instance) or may depend on some parameters (e.g., a timing difference between the UL grant and the corresponding UL transmission). For example, if the timing difference between the UL grant and the corresponding UL transmission is too small (e.g., 1 slot, 0 slot, 7 symbols), the UE 102 may not monitor the pre-emption indication or the UE 102 may not be expected or configured to monitor the pre-emption indication. In the case that slot aggregation is configured for UL transmission (e.g., pusch-AggregationFactor in PUSCH-Config information element is configured with n2, n4 or n8), the rules for pre-emption indication as mentioned above may be applied to an initial transmission only, repetition(s) (except initial transmission) only, or both initial transmission and repetition(s). The values of parameters mentioned above (e.g., T1, T2, bitmap) may be shared (e.g., may be the same) or may be different between initial transmission and repetition(s).

For a UE 102 with a configured grant, there may not be an explicit UL grant after the PUSCH transmission with the configured grant being activated (for Type 2 configured grant) or configured by RRC (for Type 1 configured grant). In this case, methods to determine the monitoring occasion for a pre-emption indication may be different. For example, the monitoring occasion may be determined by the timing of the configured transmission occasion(s) for a PUSCH with configured grant. The periodicity of a monitoring occasion may be determined by the periodicity of a PUSCH with configured grant (e.g., the periodicity of monitoring occasion may be set the same as the periodicity of PUSCH with configured grant). The time difference between the monitoring occasion and the transmission occasion (e.g., beginning or end of the configured PUSCH resource with configured grant) may be denoted by T3. In some implementations, T3 may be in a unit of slot, mini-slot or symbol. The UE 102 may only be required to monitor the UL pre-emption indication for UL cancelation, continuation, and/or re-scheduling after the PUSCH transmission with the configured grant being activated (for Type 2 configured grant) or configured by RRC (for Type 1 configured grant).

In some implementations, T3 may be fixed in the specifications, indicated by L1 signaling (e.g., PDCCH activation or other L1 signaling), or configured by RRC. In other implementations, a set of values of T3 may be configured by RRC and L1 signaling may indicate the selection of T3. In other implementations, T3 may be determined by the PUSCH preparation time $T_{proc}$, 2 for the corresponding PUSCH processing capability (e.g., T3=$T_{proc,2}$+offset_PI, where offset_PI may be any value (e.g., 0, positive value or negative value) and offset_PI may be fixed in the specification, indicated by L1 signaling, configured by RRC, or any combination of above). In other implementations, T3 may be determined by the UE processing time $T_{proc, PI}$ for the indication of UL pre-emption, cancelation, continuation, and/or re-scheduling (e.g., T3=$T_{proc,PI}$+ offset_proc_PI, where offset_proc_PI may be any value (e.g., 0, positive value or negative value) and offset_proc_PI may be fixed in the specification, indicated by L1 signaling, configured by RRC, or any combination of above).

In yet another example, the monitoring occasion may be determined by a bitmap. Each bit of the bitmap may have a one-to-one mapping to each slot, mini-slot or symbol within a period of the PUSCH with configured grant. If a bit of the bitmap indicates "1" (or "0"), the UE 102 may monitor a pre-emption indication at the corresponding slot, mini-slot or symbol, otherwise, the UE 102 may not monitor a pre-emption indication at the corresponding slot, mini-slot or symbol.

Whether to monitor a pre-emption indication or not may be configurable (by RRC, for instance) or may depend on some parameters (e.g., periodicity of the configured grant). For example, if the periodicity is too small (e.g., 2 symbols, 7 symbols, 14 symbols), the UE 102 may not monitor the pre-emption indication or the UE 102 may not be expected or configured to monitor the pre-emption indication. In the case that repetition is configured for UL transmission with a configured grant (e.g., repK in PUSCH-Config information element is configured with n2, n4 or n8), the rules for a pre-emption indication as mentioned above may be applied to the initial transmission only, repetition(s) (except initial transmission) only, or both initial transmission and repetition(s). The values of parameters mentioned above (e.g., T3, bitmap) may be shared (e.g., may be the same) or may be different between initial transmission and repetition(s).

The UE PUSCH processing time and UE processing time for pre-emption, cancelation, continuation and/or re-scheduling are described herein. The UE PUSCH preparation time $T_{proc,2}$ may be treated as the minimum time required for preparing a PUSCH transmission after the UE 102 receives the PDCCH scheduling the PUSCH. Specifically, if the first uplink symbol in the PUSCH allocation for a transport block is no earlier than at symbol L2, where L2 is defined as the next uplink symbol with its CP starting $T_{proc,2}$ after the end of the last symbol of the PDCCH carrying the DCI scheduling the PUSCH, then the UE 102 may transmit the transport block. Otherwise the UE 102 may ignore the scheduling DCI.

The UE processing time $T_{proc,PI}$ for the indication of UL pre-emption, cancelation, continuation and/or re-scheduling may be treated as the minimum time required for pre-empting, cancelling, stopping, interrupting, suspending, dropping and/or pausing (part(s) of) a corresponding PUSCH transmission after the UE 102 receives the indication of UL pre-emption, cancelation, continuation and/or re-scheduling. Specifically, if the first uplink symbol (or the first pre-empted symbol) in the PUSCH allocation for a transport block is no earlier than at symbol L3, where L3 is defined as the next uplink symbol (downlink symbol, flexible symbol, or any kind of symbol) with its CP starting $T_{proc,PI}$ after the end of the last symbol of the PDCCH (or other channel, L1 signaling) carrying the indication of UL pre-emption, cancelation, continuation and/or re-scheduling, then the UE 102 may pre-empt, cancel, stop, interrupt, suspend, drop and/or pause (part(s) of) a corresponding PUSCH transmission. Otherwise the UE 102 may ignore the indication.

The UE processing time $T_{proc,PI}$ for the indication of UL pre-emption, cancelation, continuation and/or re-scheduling may be determined by the UE capability. The UE processing time $T_{proc,PI}$ may be determined by the numerology (e.g., subcarrier spacing of the downlink with which the PDCCH or other channel/signaling carrying the indication, subcarrier spacing of the uplink channel with which the PUSCH is to be pre-empted, cancelled, dropped, re-scheduled and/or continued).

The UE processing time $T_{proc,PI}$ may be fixed in the specification, indicated by L1 signaling, configured by RRC, or any combination of above. The UE processing time $T_{proc,PI}$ may be determined by the PUSCH preparation time $T_{proc,2}$ for the corresponding PUSCH processing capability (e.g., $T_{proc,PI}=T_{proc,2}$+offset_PI_d, where offset_PI_d may be any value (e.g., 0, positive value or negative value) and offset_PI_d may be fixed in the specification, indicated by L1 signaling, configured by RRC, or any combination of above).

A set of PDCCH candidates for a UE 102 to monitor may be defined in terms of PDCCH search space sets. A search space set may be a common search space set or a UE-specific search space set. A UE 102 may monitor PDCCH candidates in one or more of the search spaces sets including a Type3-PDCCH common search space set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s); and a UE-specific search space set configured by SearchSpace in PDCCH-Config with searchSpaceType=ue-Specific for DCI formats with CRC scrambled by C-RNTI, MCS-C-RNTI, or CS-RNTI(s). An example of SearchSpace configuration is shown in Listing 7.

---

Listing 7

---

```
-- ASN1START
-- TAG-SEARCHSPACE-START
SearchSpace ::=                    SEQUENCE {
searchSpaceId                      SearchSpaceId,
controlResourceSetId               ControlResourceSetId
                                   OPTIONAL, -- Cond SetupOnly
monitoringSlotPeriodicityAndOffset CHOICE {
sl1                                NULL,
sl2                                INTEGER (0..1),
sl4                                INTEGER (0..3),
sl5                                INTEGER (0..4),
sl8                                INTEGER (0..7),
sl10                               INTEGER (0..9),
sl16                               INTEGER (0..15),
sl20                               INTEGER (0..19),
sl40                               INTEGER (0..39),
sl80                               INTEGER (0..79),
sl160                              INTEGER (0..159),
sl320                              INTEGER (0..319),
sl640                              INTEGER (0..639),
sl1280                             INTEGER (0..1279),
sl2560                             INTEGER (0..2559)
}                                  OPTIONAL, -- Cond Setup
duration                           INTEGER (2..2559)
                                   OPTIONAL, -- Need R
monitoringSymbolsWithinSlot        BIT STRING (SIZE (14))
                                   OPTIONAL, -- Cond Setup
nrofCandidates                     SEQUENCE {
aggregationLevel1                  ENUMERATED {n0, n1, n2,
                                   n3, n4, n5,
                                   n6, n8},
aggregationLevel2                  ENUMERATED {n1, n1, n2,
                                   n3, n4, n5,
                                   n6, n8},
aggregationLevel4                  ENUMERATED {n0, n1, n2,
                                   n3, n4, n5,
                                   n6, n8},
aggregationLevel8                  ENUMERATED {n0, n1, n2,
                                   n3, n4, n5,
```

---

Listing 7 -continued

---

```
                                   n6, n8},
aggregationLevel16                 ENUMERATED {n0, n1, n2,
                                   n3, n4, n5,
                                   n6, n8}
}                                  OPTIONAL, -- Cond Setup
searchSpaceType                    CHOICE {
common                             SEQUENCE {
dci-Format0-0-AndFormat1-0         SEQUENCE {
...
}                                  OPTIONAL, -- Need R
dci-Format2-0                      SEQUENCE {
nrofCandidates-SFI                 SEQUENCE {
aggregationLevel1                  ENUMERATED {n1, n2}
                                   OPTIONAL, -- Need R
aggregationLevel2                  ENUMERATED {n1, n2}
                                   OPTIONAL, -- Need R
aggregationLevel4                  ENUMERATED {n1, n2}
                                   OPTIONAL, -- Need R
aggregationLevel8                  ENUMERATED {n1, n2}
                                   OPTIONAL, -- Need R
aggregationLevel16                 ENUMERATED {n1, n2}
                                   OPTIONAL -- Need R
},
...
}                                  OPTIONAL, -- Need R
dci-Format2-1                      SEQUENCE {
...
}
dci-Format2-1*                     SEQUENCE {
...
}                                  OPTIONAL, -- Need R
dci-Format2-2                      SEQUENCE {
...
}                                  OPTIONAL, -- Need R
dci-Format2-3                      SEQUENCE {
monitoringPeriodicity              ENUMERATED {n1, n2,
                                   n4, n5,
                                   n8, n10,
                                   n16, n20
                                   }
                                   OPTIONAL, -- Cond Setup
nrofPDCCH-Candidates               ENUMERATED {n1, n2},
...
}                                  OPTIONAL -- Need R
},
ue-Specific                        SEQUENCE {
dci-Formats                        ENUMERATED {
                                   formats0-0-And-1-0,
                                   formats0-1-And-1-1,
                                   formats2-1-UL},
...
}
}                                  OPTIONAL -- Cond Setup
}
-- TAG-SEARCHSPACE-STOP
-- ASN1STOP_
```

---

If UL PI DCI is introduced, a UE 102 may monitor PDCCH candidates in a new common search space which may be named as Type4-PDCCH common search space set configured by higher layer parameter SearchSpaceULPI in PDCCH-Config with searchSpaceType=common for DCI formats with CRC scrambled by INT-RNTI, or INT-UL-RNTI. The higher layer parameter SearchSpaceULPI may provide monitoring periodicity and an offset, a number of consecutive slots that a search space lasts in every occasion, symbols for PDCCH monitoring in the slots configured for PDCCH monitoring, a number of PDCCH candidates per aggregation level, an identity of the search space, a search space type indicating whether this is a common search space (present) and/or a UE-specific search space as well as DCI formats to monitor for T1, T2, T3, offset_proc_PI, offset_PI, $T_{proc,PI}$, offset_PI_d, etc., which are described above.

If UL PI DCI is introduced, a UE 102 may reuse an existing Type3-PDCCH common search space set configured by higher layer parameter SearchSpace in PDCCH-Config with searchSpaceType=common with a newly introduced DCI format (e.g., dciFormat2-1* in Listing 7) and/or other parameters described above. If dci-Format2-1* is configured, the UE 102 may monitor the DCI format 2_1* with CRC scrambled by INT-UL-RNTI or INT-UL-RNTI.

If UL PI DCI is introduced, a UE 102 may reuse the UE-specific search space set configured by SearchSpace in PDCCH-Config with searchSpaceType=ue-Specific with a newly introduced DCI format (e.g., formats2-1-UL in Listing 7) and/or other parameters mentioned above. If the parameter dci-Formats in ue-Specific indicates formats2-1-UL, it configures this search space as UE-specific search space (USS). The UE 102 may monitor the DCI format (DCI format 2_1* ) with CRC scrambled by INT-UL-RNTI or INT-UL-RNTI.

PDCCH monitoring for UL preemption may be associated with PDCCH monitoring of DCI format 0_0 and 0_1. Namely, the gNB 160 may configure a PDCCH monitoring occasion (in CSS and/or in USS) for DCI format 0_0 and 0_1. And, the UE 102 may determine PDCCH monitoring occasion for UL preemption based on the configuration for DCI format 0_0 and 0_1. For example, if the UE 102 detects DCI format 0_0 and 0_1 in USS, the UE 102 may monitor PDCCH for UL preemption in the USS (i.e., the same search space set of the USS where the UE 102 detects DCI format 0_0 and 0_1). Also, if the UE 102 detects DCI format 0_0 and 0_1 in CSS, the UE 102 may monitor PDCCH for UL preemption in the CSS (i.e., the same search space set of the CSS where the UE 102 detects DCI format 0_0 and 0_1).

Whether a PDSCH can be pre-empted by another PDSCH may depend on priorities of PDSCHs. In general, a PDSCH using low SE MCS table (e.g., the PDSCH transmission corresponding to the low SE MCS table) may have the higher priority. Some examples for handling DL multiplexing of different transmissions are described herein.

For PDSCH scheduled by PDCCH with CRC scrambled by new-RNTI, if a UE 102 detects PDCCH conveying DCI format 2_1 with CRC scrambled by INT-RNTI, which indicates (the corresponding part(s) of) the PDSCH is pre-empted/interrupted, the UE 102 may ignore (e.g., skip, omit, drop) the PDCCH conveying DCI format 2_1 and/or assume transmission to the UE 102. In yet another example, for PDSCH scheduled by PDCCH with CRC scrambled by a new-RNTI, if the UE 102 detects PDCCH conveying DCI format 2_1 with CRC scrambled by INT-RNTI, the UE 102 may assume no transmission in the corresponding part(s) (of the PDSCH) indicated by the PDCCH conveying DCI format 2_1.

For PDSCH scheduled by PDCCH with CRC scrambled by CS-RNTI, if the UE 102 is configured with low SE for PDSCH transmission (e.g., a low SE MCS table is configured by a higher layer parameter(s) (e.g., mcs-Table in PDSCH-Config is set to 'qam64LowSE' and/or mcs-Table in SPS-config is set to 'qam64LowSE')), and if the UE 102 detects PDCCH conveying DCI format 2_1 with CRC scrambled by INT-RNTI, which indicates (the corresponding part(s) of) the PDSCH is preempted/interrupted, the UE 102 may ignore the PDCCH conveying DCI format 2_1 and/or may assume transmission to the UE 102. In yet another example, for PDSCH scheduled by PDCCH with CRC scrambled by CS-RNTI, if the UE 102 is configured with low SE for PDSCH transmission (e.g., a low SE MCS table is configured by a higher layer parameter(s)), the UE 102 may assume no transmission in the corresponding part(s) (of the PDSCH) indicated by the PDCCH conveying DCI format 2_1.

For SPS PDSCH, if a UE 102 is configured with low SE for SPS PDSCH transmission (e.g., a low SE MCS table is configured by a higher layer parameter(s) (e.g., mcs-Table in PDSCH-Config is set to 'qam64LowSE' and/or mcs-Table in SPS-config is set to 'qam64LowSE')), and if the UE 102 detects PDCCH conveying DCI format 2_1 with CRC scrambled by INT-RNTI, which indicates (the corresponding part(s) of) the PDSCH is pre-empted/interrupted, the UE 102 may ignore the PDCCH conveying DCI format 2_1 and/or may assume transmission to the UE 102. In yet another example, for SPS PDSCH, if the UE 102 is configured with low SE for SPS PDSCH transmission (e.g., low SE MCS table is configured by a higher layer parameter(s)), the UE 102 may assume no transmission in the corresponding part(s) indicated by the PDCCH conveying DCI format 2_1.

For PDSCH scheduled by PDCCH with CRC scrambled by C-RNTI (and/or SI-RNTI, and/or RA-RNTI, and/or P-RNTI), if a UE 102 is configured with low SE for PDSCH transmission (e.g., a low SE MCS table is configured by a higher layer parameter(s) (e.g., mcs-Table in PDSCH-Config is set to 'qam64LowSE')), if the UE 102 detects PDCCH conveying DCI format 2_1 with CRC scrambled by INT-RNTI, which indicates (part(s) of) the PDSCH is pre-empted/interrupted, the UE 102 may ignore the PDCCH conveying DCI format 2_1 and/or assume transmission to the UE 102. In yet another example, for PDSCH scheduled PDCCH with CRC scrambled by C-RNTI (and/or SI-RNTI, and/or RA-RNTI, and/or P-RNTI), if the UE 102 is configured with low SE for PDSCH transmission (e.g., a low SE MCS table is configured by a higher layer parameter(s)), the UE 102 may assume no transmission in the corresponding part(s) indicated by the PDCCH conveying DCI format 2_1.

Whether a PUSCH can be pre-empted by another PUSCH may depend on the priorities of PUSCHs. In general, a PUSCH using a low SE MCS table (e.g., the PUSCH transmission corresponding to the low SE MCS table) may have the higher priority. Some examples for handling UL multiplexing of different transmissions are described in the following.

For PUSCH scheduled by PDCCH with CRC scrambled by new-RNTI, if a UE 102 detects PDCCH conveying the UL PI DCI format(s) indicating (the corresponding part(s) of) the PUSCH is pre-empted/interrupted (as mentioned above), the UE 102 may ignore the PDCCH conveying the UL PI DCI format(s) and/or assume transmission is allowed from the UE 102 (e.g., transmission is allowed as usual). Namely, for PUSCH transmission indicated by PDCCH with CRC scrambled by new-RNTI, the UE 102 may always assume transmission is allowed from the UE 102. For example, for PUSCH transmission indicated by PDCCH with CRC scrambled by new-RNTI, the UE 102 may not perform no transmission. For example, for a PUSCH transmission indicated by PDCCH with CRC scrambled by new-RNTI, the UE 102 may not be expected to receive (e.g., monitor) the UL PI DCI format(s). For example, even if the UE 102 is configured to monitor the UL PI DCI format(s) as described above, for a PUSCH transmission indicated by PDCCH with CRC scrambled by new-RNTI, the UE 102 may not monitor (e.g., the UE 102 may not be expected to monitor) the UL PI DCI format(s). In yet another example, UE 102 may take action (e.g., avoid/skip pre-empted part(s) by puncturing, rate-matching, pausing-resuming, abandoning) by a fixed/pre-defined rule or by following RRC message (e.g., higher layer parameter UEBehavior) as mentioned above.

For PUSCH with configured grant (e.g., for Type1 PUSCH transmission and/or for Type2 PUSCH transmission), if a UE 102 is configured with low SE for grant-free transmission (e.g., a low SE MCS table is configured by a higher layer parameter(s) (e.g., mcs-TableTransformPrecoder in ConfiguredGrantConfig is set to 'qam64LowSE' and/or mcs-Table in ConfiguredGrantConfig is set to 'qam64LowSE')), and if the UE 102 detects PDCCH conveying the UL PI DCI format(s) indicating (the corresponding part(s) of) the PUSCH is preempted/interrupted (as mentioned above), the UE 102 may ignore the PDCCH conveying the UL PI DCI format(s) and/or assume transmission is allowed from the UE 102 (e.g., transmission is allowed as usual). Namely, for PUSCH transmission with the configured grant, if a low MCS table is configured, the UE 102 always assumes transmission is allowed from the UE 102. For example, for PUSCH transmission with the configured grant, the UE 102 may not perform no transmission (i.e., the grant-fee transmission). For example, for PUSCH transmission with the configured grant, the UE 102 may not be expected to receive (e.g., monitor) the UL PI DCI format(s). For example, even if the UE 102 is configured to monitor the UL PI DCI format(s) as described above, for PUSCH transmission with the configured grant, the UE 102 may not monitor (e.g., the UE 102 may not be expected to monitor) the UL PI DCI format(s). In yet another example, the UE 102 may take action (e.g., avoid/skip pre-empted part(s) by puncturing, rate-matching, pausing-resuming, abandoning) by a fixed/pre-defined rule or by following RRC message (e.g., higher layer parameter UEBehavior) as mentioned above.

For PUSCH (e.g., PUSCH initial transmission and/or retransmission) scheduled by PDCCH with CRC scrambled by CS-RNTI, if the UE 102 is configured with low SE for PUSCH transmission (e.g., a low SE MCS table is configured by a higher layer parameter(s) (e.g., mcs-TableTransformPrecoder in ConfiguredGrantConfig and/or PUSCH-Config is set to 'qam64LowSE' and/or mcs-Table in ConfiguredGrantConfig and/or PUSCH-Config is set to 'qam64LowSE')), and if the UE 102 detects PDCCH conveying the UL PI DCI format(s) indicating (the corresponding part(s) of) the PUSCH is pre-empted/interrupted (as mentioned above), the UE 102 may ignore the PDCCH conveying the UL PI DCI format(s) and/or assume transmission is allowed from the UE 102 (e.g., transmission is allowed as usual). Namely, for PUSCH transmission indicated by PDCCH with CRC scrambled by CS-RNTI, if low MCS table is configured, the UE 102 may always assume transmission is allowed from the UE 102. For example, for a PUSCH transmission indicated by PDCCH with CRC scrambled by CS-RNTI, the UE 102 may not perform no transmission. For example, for PUSCH transmission indicated by PDCCH with CRC scrambled by CS-RNTI, the UE 102 may not be expected to receive (e.g., monitor) the UL PI DCI format(s). For example, even if the UE 102 is configured to monitor the UL PI DCI format(s) as described above, for PUSCH transmission indicated by PDCCH with CRC scrambled CS-RNTI, the UE 102 may not monitor (e.g., the UE 102 may not be expected to monitor) the UL PI DCI format(s). In yet another example, the UE 102 may take action (e.g., avoid/skip pre-empted part(s) by puncturing, rate-matching, pausing-resuming, abandoning) by a fixed/pre-defined rule or by following RRC message (e.g., higher layer parameter UEBehavior) as mentioned above.

For PUSCH scheduled by PDCCH with CRC scrambled by C-RNTI (and/or TC-RNTI, and/or SP-CSI-RNTI), if a UE 102 is configured with low SE for PUSCH transmission (e.g., a low SE MCS table is configured by a higher layer parameter(s) (e.g., mcs-TableTransformPrecoder in ConfiguredGrantConfig and/or PUSCH-Config is set to 'qam64LowSE' and/or mcs-Table in ConfiguredGrantConfig and/or PUSCH-Config is set to 'qam64LowSE')), and if the UE 102 detects PDCCH conveying the UL PI DCI format(s) indicating (the corresponding part(s) of) the PUSCH is preempted/interrupted (as mentioned above), the UE 102 may ignore the PDCCH conveying the UL PI DCI format(s) and/or assume transmission is allowed from the UE 102 (e.g., transmission is allowed as usual). Namely, for PUSCH transmission indicated by PDCCH with CRC scrambled by C-RNTI, if a low MCS table is configured, the UE 102 always assumes transmission is allowed from the UE 102. For example, for PUSCH transmission indicated by PDCCH with CRC scrambled by C-RNTI, the UE 102 may not perform no transmission. For example, for PUSCH transmission indicated by PDCCH with CRC scrambled by C-RNTI, the UE 102 may not be expected to receive (e.g., monitor) the UL PI DCI format(s). For example, even if the UE 102 is configured to monitor the UL PI DCI format(s) as described above, for PUSCH transmission indicated by PDCCH with CRC scrambled C-RNTI, the UE 102 may not monitor (e.g., the UE 102 may not be expected to monitor) the UL PI DCI format(s). In yet another example, the UE 102 may take action (e.g., avoid/skip pre-empted part(s) by puncturing, rate-matching, pausing-resuming, abandoning) by a fixed/pre-defined rule or by following RRC message (e.g., higher layer parameter UEBehavior) as mentioned above.

For PUSCH scheduled by PDCCH with CRC scrambled by TC-RNTI, if the UE 102 detects PDCCH conveying the UL PI DCI format(s) indicating (the corresponding part(s) of) the PUSCH is pre-empted/interrupted (as mentioned above), the UE 102 may ignore the PDCCH conveying the UL PI DCI format(s) and/or assume transmission is allowed from the UE 102 (e.g., transmission is allowed as usual). Namely, for PUSCH transmission indicated by PDCCH with CRC scrambled by TC-RNTI, even if the UE 102 detects PDCCH conveying the UL PI DCI format(s), the UE 102 always assumes transmission is allowed from the UE 102. For example, for PUSCH transmission indicated by PDCCH with CRC scrambled by TC-RNTI, even if the UE 102 detects PDCCH conveying the UL PI DCI format(s), the UE 102 may not perform no transmission. For example, for PUSCH transmission indicated by PDCCH with CRC scrambled by TC-RNTI, the UE 102 may not be expected to receive (e.g., monitor) the UL PI DCI format(s). For example, for PUSCH transmission indicated by PDCCH with CRC scrambled by TC-RNTI, even if the UE 102 detects PDCCH conveying the UL PI DCI format(s), the UE 102 may perform transmission (e.g., PUSCH transmission) from the UE 102. In yet another example, the UE 102 may take action (e.g., avoid/skip pre-empted part(s) by puncturing, rate-matching, pausing-resuming, abandoning) by a fixed/pre-defined rule or by following RRC message (e.g., higher layer parameter UEBehavior) as mentioned above.

Also, for a first PUSCH scheduled by a first PDCCH with CRC scrambled by new-RNTI, if a UE 102 detects a second PDCCH with CRC scrambled by C-RNTI (and/or TC-RNTI, and/or SP-CSI-RNTI), which schedules a second PUSCH overlapping with the first PUSCH (the first PUSCH and the second PUSCH may be scheduled with same PRB(s) and/or same symbol(s)), the UE 102 may ignore the second PDCCH and/or transmit by following the first PDCCH. Namely, in a case that the first PUSCH transmission indicated by the first PDCCH with CRC scrambled by new-RNTI and the second PUSCH transmission indicated by the second PDCCH with CRC scrambled by C-RNTI (and/or TC-RNTI, and/or SP-CSI-RNTI) would occur at the same PRB(s) and/or the same symbol(s) (at the same time (e.g., at the same timing)), the UE 102 may perform only the first PUSCH transmission. Namely, in this case, the UE 102 may drop the second PUSCH transmission indicated by the second PDCCH with CRC scrambled by C-RNTI (and/or TC-RNTI, and/or SP-CSI RNTI). In yet another example, the UE 102 may ignore the first PDCCH and/or transmit by following the second PDCCH. Namely, in a case that the first PUSCH transmission indicated by the first PDCCH with CRC scrambled by new-RNTI and the second PUSCH transmission indicated by the second PDCCH with CRC scrambled by C-RNTI (and/or TC-RNTI, and/or SP-CSI-RNTI) would occur at the same PRB(s) and/or the same symbol(s) (at the same time (e.g., at the same timing)), the UE 102 may perform only the second PUSCH transmission. Namely, in this case, the UE 102 may drop the first PUSCH transmission indicated by the first PDCCH with CRC scrambled by new-RNTI. In yet another example, both PUSCHs are transmitted but the first PUSCH may avoid the overlapping with the second PUSCH by puncturing, rate-matching, pausing-resuming, abandoning (by following fixed/pre-defined rule or RRC message). In yet another example, both PUSCHs are transmitted but the second PUSCH may avoid the overlapping with the first PUSCH by puncturing, rate-matching, pausing-resuming, abandoning (by following fixed/pre-defined rule or RRC message). Here, high SE (e.g., the high SE MCS table) and/or normal SE (e.g., the normal SE MCS table) and/or low SE (e.g., the low SE MCS table) may be configured by a higher layer parameter(s) (as mentioned above) for the second PUSCH transmission.

For a first PUSCH with configured grant (e.g., for Type1 PUSCH transmission and/or for Type2 PUSCH transmission) corresponding to the low SE (e.g., a low SE MCS table is configured by a higher layer parameter(s) for the first PUSCH transmission (e.g., the grant-free transmission) (e.g., mcs-TableTransformPrecoder in ConfiguredGrant-Config is set to 'qam64LowSE' and/or mcs-Table in ConfiguredGrantConfig is set to 'qam64LowSE')), if a UE 102 detects a second PDCCH with CRC scrambled by C-RNTI (and/or TC-RNTI, and/or SP-CSI-RNTI), which schedules a second PUSCH overlapping with the first PUSCH (the first PUSCH and the second PUSCH may be scheduled with same PRB(s) and/or same symbol(s)), the UE 102 may ignore the second PDCCH and/or transmit the first PUSCH. Namely, in a case that the first PUSCH transmission indicated by the configured grant corresponding to the low SE MCS table and the second PUSCH transmission indicated by the second PDCCH with CRC scrambled by C-RNTI (and/or TC-RNTI, and/or SP-CSI-RNTI) would occur at the same PRB(s) and/or the same symbol(s) (at the same time (e.g., at the same timing)), the UE 102 may perform only the first PUSCH transmission. Namely, in this case, the UE 102 may drop the second PUSCH transmission indicated by the second PDCCH with CRC scrambled by C-RNTI (and/or TC-RNTI, and/or SP-CSI-RNTI).

Here, in this case, high SE (e.g., the high SE MCS table) and/or normal SE (e.g., the normal SE MCS table) and/or low SE (e.g., the low SE MCS table) may be configured by a higher layer parameter(s) (as mentioned above) for the second PUSCH transmission. Namely, the second PUSCH transmission may be corresponding to high SE (e.g., the high SE MCS table) and/or normal SE (e.g., the normal SE MCS) and/or low SE (e.g., the low SE MCS table). In yet another example, the UE 102 may ignore the configured grant and/or transmit by following the second PDCCH. Namely, in a case that the first PUSCH transmission indicated by the configured grant corresponding to the low SE MCS table and the second PUSCH transmission indicated by the second PDCCH with CRC scrambled by C-RNTI (and/or TC-RNTI, and/or SP-CSI-RNTI) corresponding the high SE MCS table and/or the normal SE MCS table and/or the low SE MCS table would occur at the same PRB(s) and/or the same symbol(s) (at the same time (e.g., at the same timing)), the UE 102 may perform only the second PUSCH transmission. Namely, in this case, the UE 102 may drop the first PUSCH transmission indicated by the configured grant corresponding to the low SE MCS table and/or the normal SE MCS table and/or the low SE MCS table. In yet another example, both PUSCHs are transmitted but the first PUSCH may avoid the overlapping with the second PUSCH by puncturing, rate-matching, pausing-resuming, abandoning (by following fixed/pre-defined rule or RRC message). In yet another example, both PUSCHs are transmitted but the second PUSCH may avoid the overlapping with the first PUSCH by puncturing, rate-matching, pausing-resuming, abandoning (by following fixed/pre-defined rule or RRC message).

For a first PUSCH with configured grant (e.g., for Type1 PUSCH transmission and/or for Type2 PUSCH transmission) corresponding to low (and/or normal, and/or high) SE (e.g., low (and/or normal, and/or high) SE MCS table is configured by a higher layer parameter(s) for the first PUSCH transmission), if a UE 102 detects a second PDCCH with CRC scrambled by new-RNTI, which schedules a second PUSCH overlapping with the first PUSCH (the first PUSCH and the second PUSCH may be scheduled with same PRB(s) and/or same symbol(s)), the UE 102 may ignore the second PDCCH and/or transmit the first PUSCH. Namely, in a case that the first PUSCH transmission indicated by the configured grant corresponding to the low (and/or the normal, and/or the high) SE MCS table and the second PUSCH transmission indicated by the second PDCCH with CRC scrambled by new-RNTI would occur at the same PRB(s) and/or the same symbol(s) (at the same time (e.g., at the same timing)), the UE 102 may perform only the first PUSCH transmission. Namely, in this case, the UE 102 may drop the second PUSCH transmission indicated by the PDCCH with CRC scrambled by new-RNTI. In yet another example, for the first PUSCH with the configured grant (e.g., for Type1 PUSCH transmission and/or for Type2 PUSCH transmission) corresponding to low (and/or normal, and/or high) SE (e.g., low (and/or normal, and/or high) SE MCS table is configured by a higher layer parameter(s) for the first PUSCH transmission), if the UE 102 detects the second PDCCH with CRC scrambled by new-RNTI, which schedules the second PUSCH overlapping with the first PUSCH (the first PUSCH and the second PUSCH may be scheduled with same PRB(s) and/or same symbol(s)), the UE 102 may ignore the configured grant and/or transmit by following the second PDCCH. Namely, in a case that the first PUSCH transmission indicated by the configured grant corresponding to the low (and/or the normal, and/or the high) SE MCS table and the second PUSCH transmission indicated by the second PDCCH with CRC scrambled by new-RNTI would occur at the same PRB(s) and/or the same symbol(s) (at the same time (e.g., at the same timing)), the UE 102 may perform only the second PUSCH transmission.

Namely, in this case, the UE 102 may drop the first PUSCH transmission indicated by the configured grant. In yet another example, both PUSCHs are transmitted but the first PUSCH may avoid the overlapping with the second PUSCH by puncturing, rate-matching, pausing-resuming, abandoning (by following fixed/pre-defined rule or RRC message). In yet another example, both PUSCHs are transmitted but the second PUSCH may avoid the overlapping with the first PUSCH by puncturing, rate-matching, pausing-resuming, abandoning (by following fixed/pre-defined rule or RRC message).

For a first PUSCH (e.g., a first PUSCH initial transmission and/or retransmission) scheduled by a first PDCCH with CRC scrambled by CS-RNTI corresponding to the low SE (e.g., the low SE MCS table is configured by a higher layer parameter(s) for the first PUSCH (e.g., the grant-free transmission) (e.g., mcs-TableTransformPrecoder in ConfiguredGrantConfig is set to 'qam64LowSE' and/or mcs-Table in ConfiguredGrantConfig is set to 'qam64LowSE')), if the UE 102 detects a second PDCCH with CRC scrambled by C-RNTI (and/or TC-RNTI, and/or SP-CSI-RNTI), which schedules a second PUSCH overlapping with the first PUSCH (the first PUSCH and the second PUSCH may be scheduled with same PRB(s) and/or same symbol(s)), the UE 102 may ignore the second PDCCH and/or transmit the first PUSCH. Namely, in a case that the first PUSCH transmission indicated by the first PDCCH with CRC scrambled by CS-RNTI corresponding to the low SE MCS table and the second PUSCH transmission indicated by the second PDCCH with CRC scrambled by C-RNTI (and/or TC-RNTI, and/or SP-CSI-RNTI) would occur at the same PRB(s) and/or the same symbol(s) (at the same time (e.g., at the same timing)), the UE 102 may perform only the first PUSCH transmission. Namely, in this case, the UE 102 may drop the second PUSCH transmission indicated by the second PDCCH with CRC scrambled by C-RNTI (and/or TC-RNTI, and/or SP-CSI-RNTI).

Here, in this case, high SE (e.g., the high SE MCS table) and/or normal SE (e.g., the normal SE MCS table) and/or low SE (e.g., the low SE MCS table) may be configured by a higher layer parameter(s) (as mentioned above) for the second PUSCH transmission. Namely, the second PUSCH transmission may be corresponding to high SE (e.g., the high SE MCS table) and/or normal SE (e.g., the normal SE MCS table) and/or low SE (e.g., the low SE MCS table).

In yet another example, for the first PUSCH (e.g., the first PUSCH initial transmission and/or retransmission) scheduled by the first PDCCH with CRC scrambled by CS-RNTI corresponding to the low SE (e.g., the low SE MCS table is configured by a higher layer parameter(s) for the PUSCH (e.g., the grant-free transmission)), if a UE 102 detects the second PDCCH with CRC scrambled by C-RNTI (and/or TC-RNTI, and/or SP-CSI RNTI), which schedules the second PUSCH overlapping with the first PUSCH (the first PUSCH and the second PUSCH may be scheduled with same PRB(s) and/or same symbols), the UE 102 may ignore the first PDCCH and/or transmit by following the second PDCCH. Namely, in a case that the first PUSCH transmission indicated by the first PDCCH with CRC scrambled by CS-RNTI corresponding to the low SE MCS table and the second PUSCH transmission indicated by the second PDCCH with CRC scrambled by C-RNTI (and/or TC-RNTI, and/or SP-CSI-RNTI) would occur at the same PRB(s) and/or the same symbol(s) (at the same time (e.g., at the same timing)), the UE 102 may perform only the second PUSCH transmission. Namely, in this case, the UE 102 may drop the first PUSCH transmission indicated by the first PDCCH with CRC scrambled by CS-RNTI corresponding to the low SE.

Here, in this case, high SE (e.g., the high SE MCS table) and/or normal SE (e.g., the normal SE MCS table) and/or low SE (e.g., the low SE MCS table) may be configured by a higher layer parameter(s) (as mentioned above) for the second PUSCH transmission. Namely, the second PUSCH transmission may be corresponding to high SE (e.g., the high SE MCS table) and/or normal SE (e.g., the normal SE MCS table) and/or low SE (e.g., the low SE MCS table).

In yet another example, both PUSCHs are transmitted but the first PUSCH may avoid the overlapping with the second PUSCH by puncturing, rate-matching, pausing-resuming, abandoning (by following fixed/pre-defined rule or RRC message). In yet another example, both PUSCHs are transmitted but the second PUSCH may avoid the overlapping with the first PUSCH by puncturing, rate-matching, pausing-resuming, abandoning (by following fixed/pre-defined rule or RRC message).

For a first PUSCH (e.g., a first PUSCH initial transmission and/or retransmission) scheduled by a first PDCCH with CRC scrambled by CS-RNTI corresponding low (and/or high, and/or normal) SE (e.g., the low (and/or high, and/or normal) SE MCS table is configured by a higher layer parameter(s) for the first PUSCH transmission (e.g., the grant-free transmission)), if the UE 102 detects a second PDCCH with CRC scrambled by new-RNTI, which schedules a second PUSCH overlapping with the first PUSCH (the first PUSCH and the second PUSCH may be scheduled with same PRB(s) and/or same symbol(s)), the UE 102 may ignore the second PDCCH and/or transmit the first PUSCH. Namely, in a case that the first PUSCH transmission indicated by the first PDCCH with CRC scrambled by CS-RNTI corresponding to the low (and/or high, and/or normal) SE MCS table and the second PUSCH transmission indicated by the second PDCCH with CRC scrambled by new-RNTI would occur at the same PRB(s) and/or the same symbol(s) (at the same time (e.g., at the same timing)), the UE 102 may perform only the first PUSCH transmission. Namely, in this case, the UE 102 may drop the second PUSCH transmission indicated by the second PDCCH with CRC scrambled by new-RNTI.

In yet another example, for the first PUSCH (e.g., the first PUSCH initial transmission and/or retransmission) scheduled by the first PDCCH with CRC scrambled by CS-RNTI corresponding low (and/or high, and/or normal) SE (e.g., the low (and/or high, and/or normal) MCS table is configured by a higher layer parameter(s) for the first PUSCH transmission (e.g., the grant-free transmission)), if the UE 102 detects the second PDCCH with CRC scrambled by new-RNTI, which schedules the second PUSCH overlapping with the first PUSCH (the first PUSCH and the second PUSCH may be scheduled with same PRB(s) and/or same symbols(s)), the UE 102 may ignore the first PDCCH and/or transmit by following the second PDCCH. Namely, in a case that the first PUSCH transmission indicated by the first PDCCH with CRC scrambled by CS-RNTI corresponding to the low (and/or high, and/or normal) SE MCS table and the second PUSCH transmission indicated by the second PDCCH with CRC scrambled by new-RNTI would occur at the same PRB(s) and/or the same symbol(s) (at the same time (e.g., at the same timing)), the UE 102 may perform only the second PUSCH transmission. Namely, in this case, the UE 102 may drop the first PUSCH transmission indicated by the first PDCCH with CRC scrambled by CS-RNTI corresponding to the low (and/or high, and/or normal) SE. In yet another example, both PUSCHs are transmitted but the first PUSCH may avoid the overlapping with the second PUSCH by puncturing, rate-matching, pausing-resuming, abandoning (by following fixed/pre-defined rule or RRC message). In yet another example, both PUSCHs are transmitted but the second PUSCH may avoid the overlapping with the first PUSCH by puncturing, rate-matching, pausing-resuming, abandoning (by following fixed/pre-defined rule or RRC message).

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform ultra-reliable and low-latency communications as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
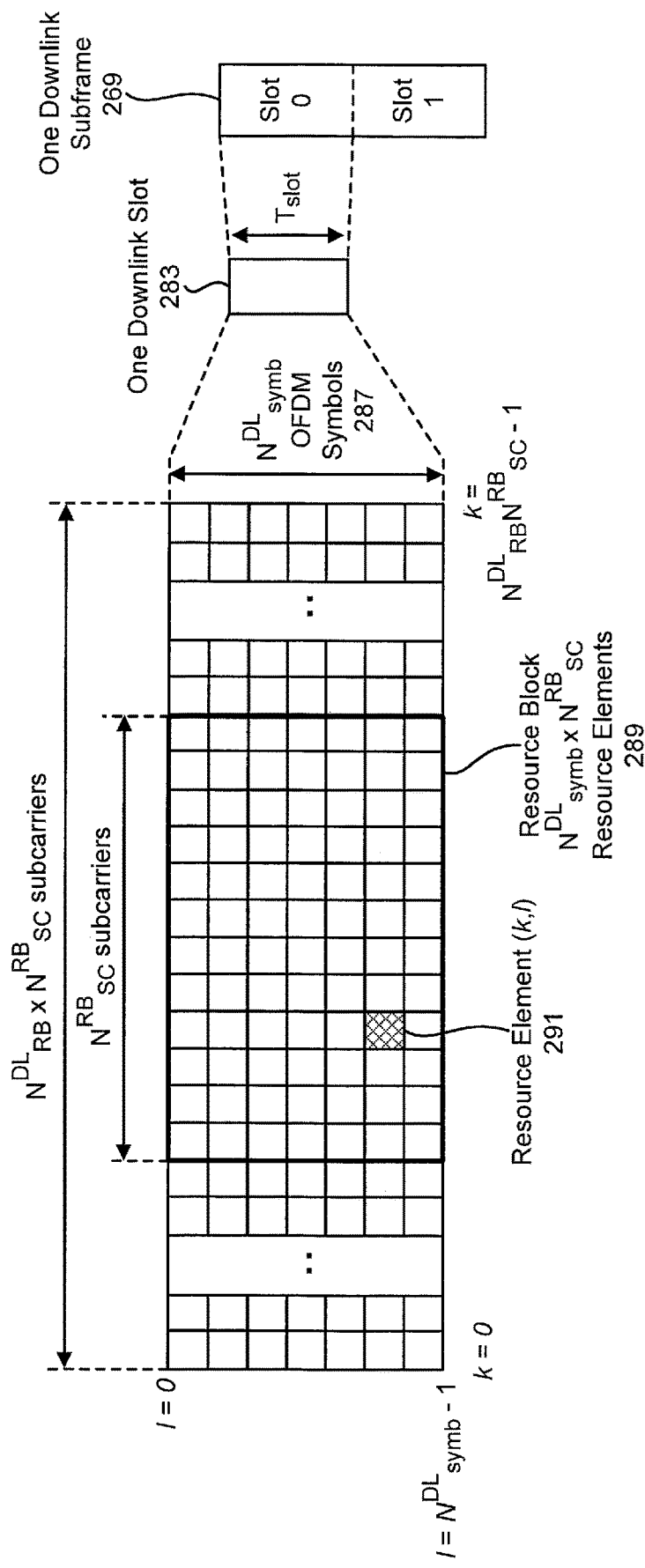
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
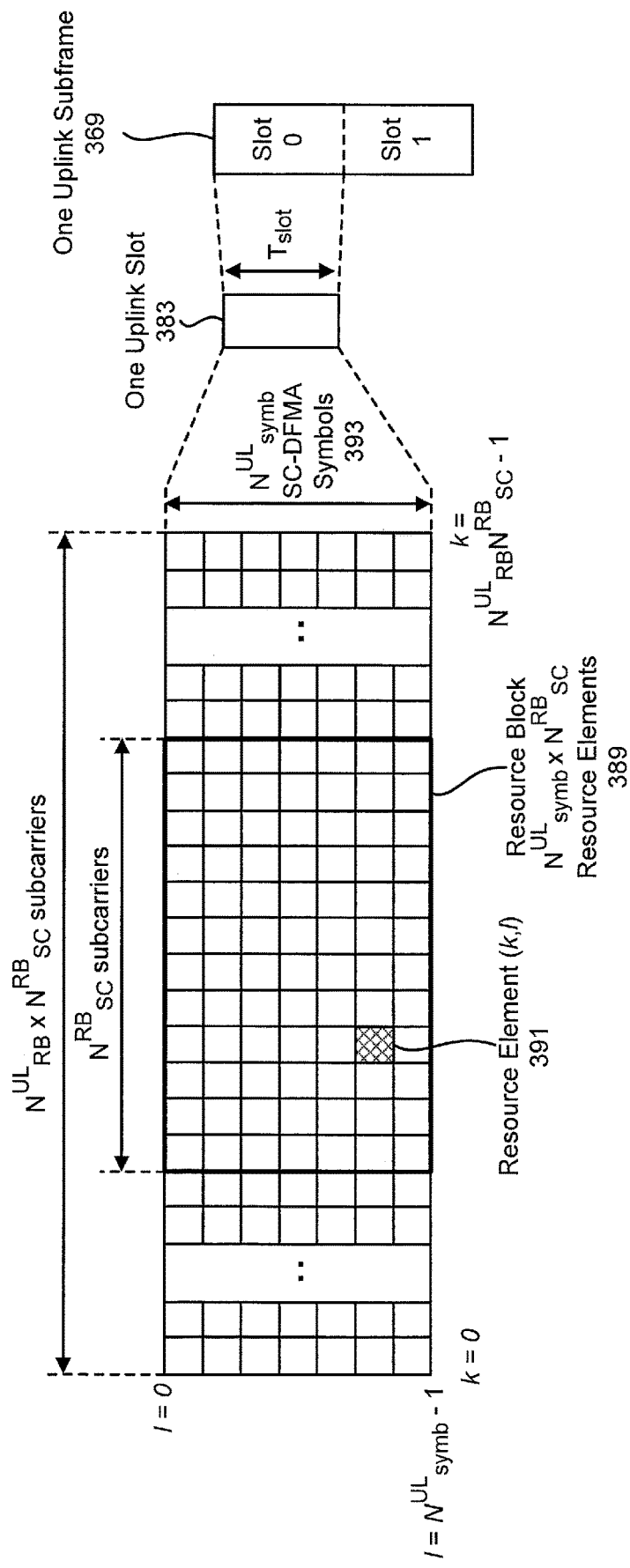
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
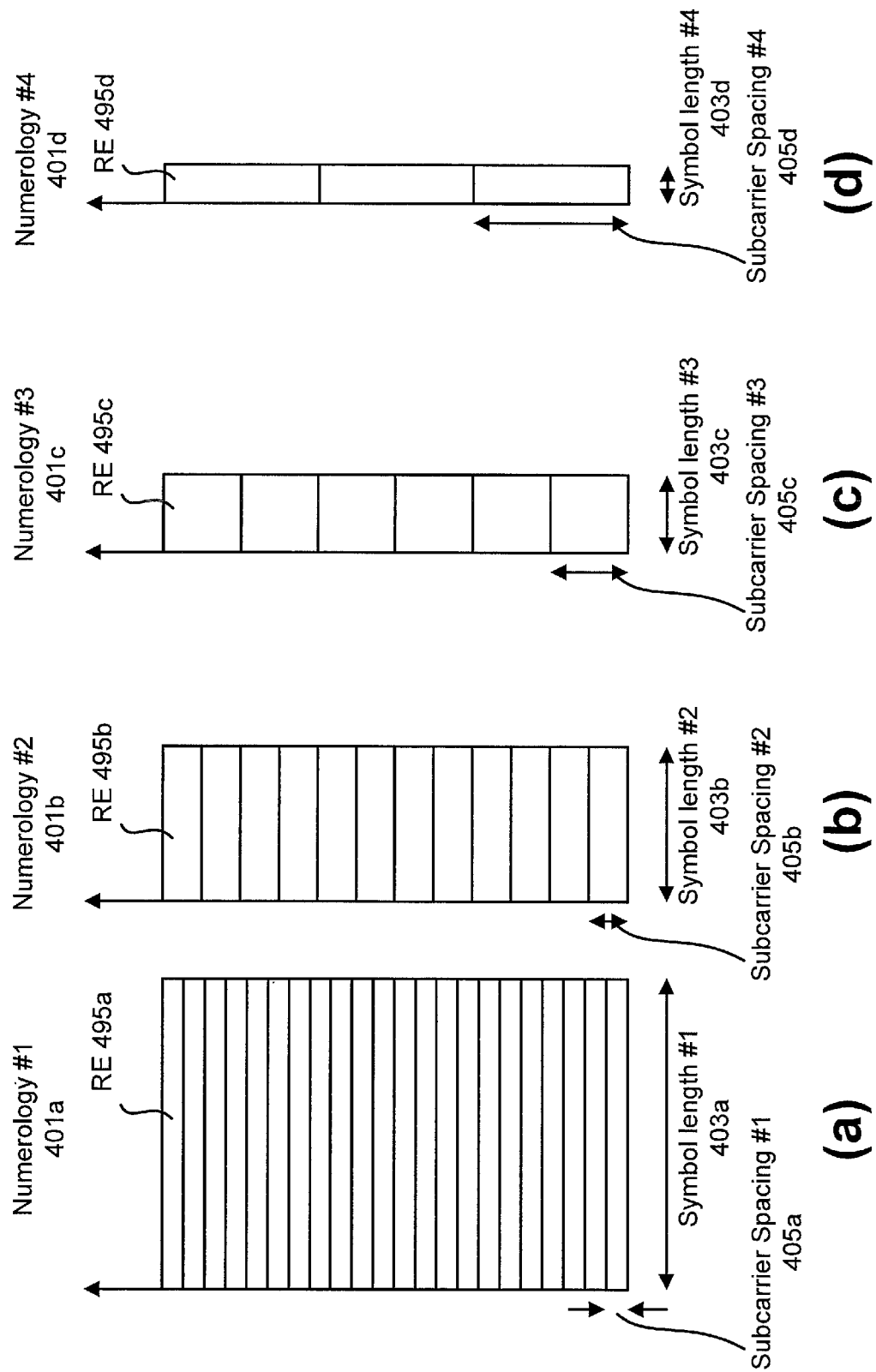
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
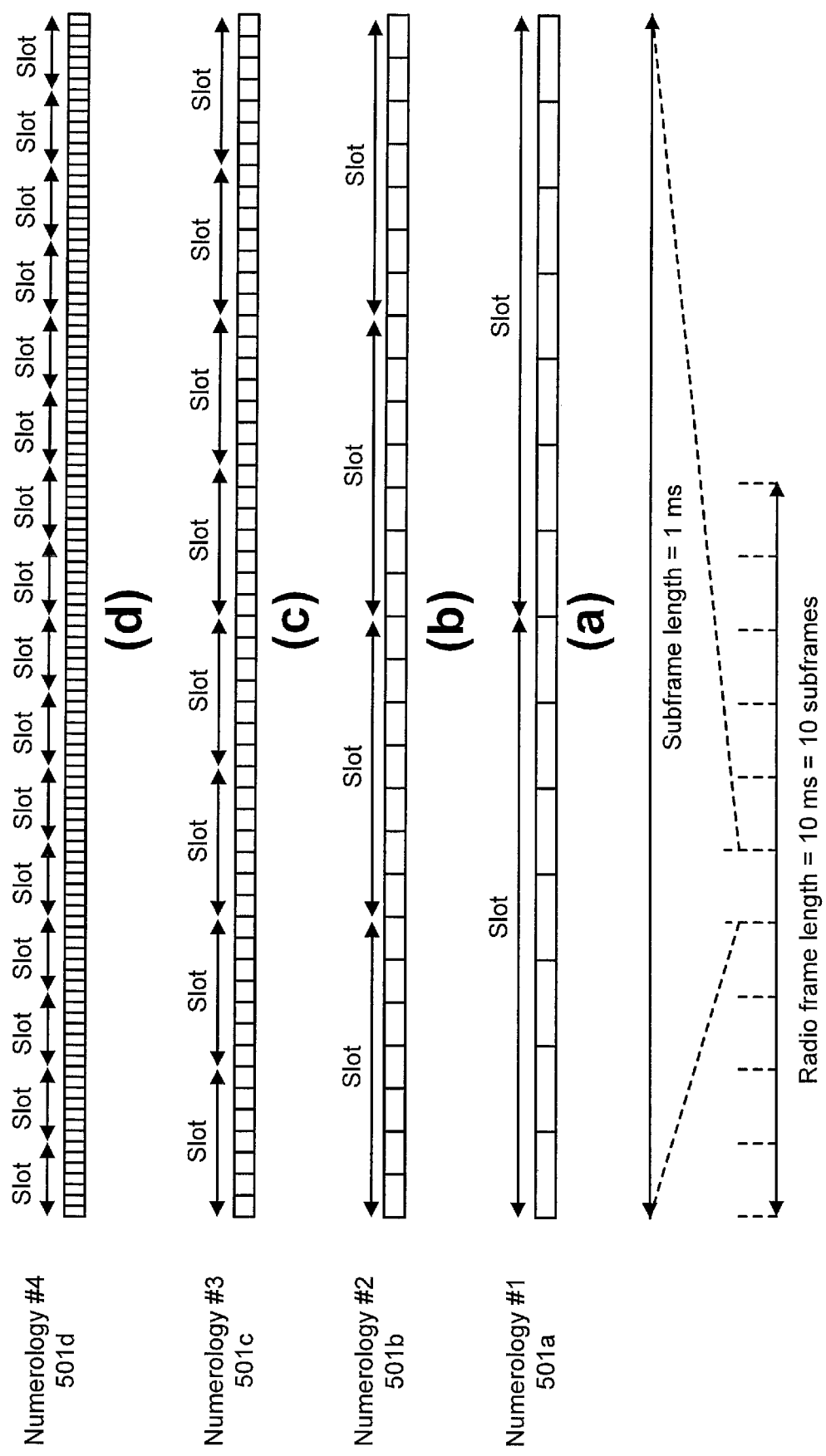
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
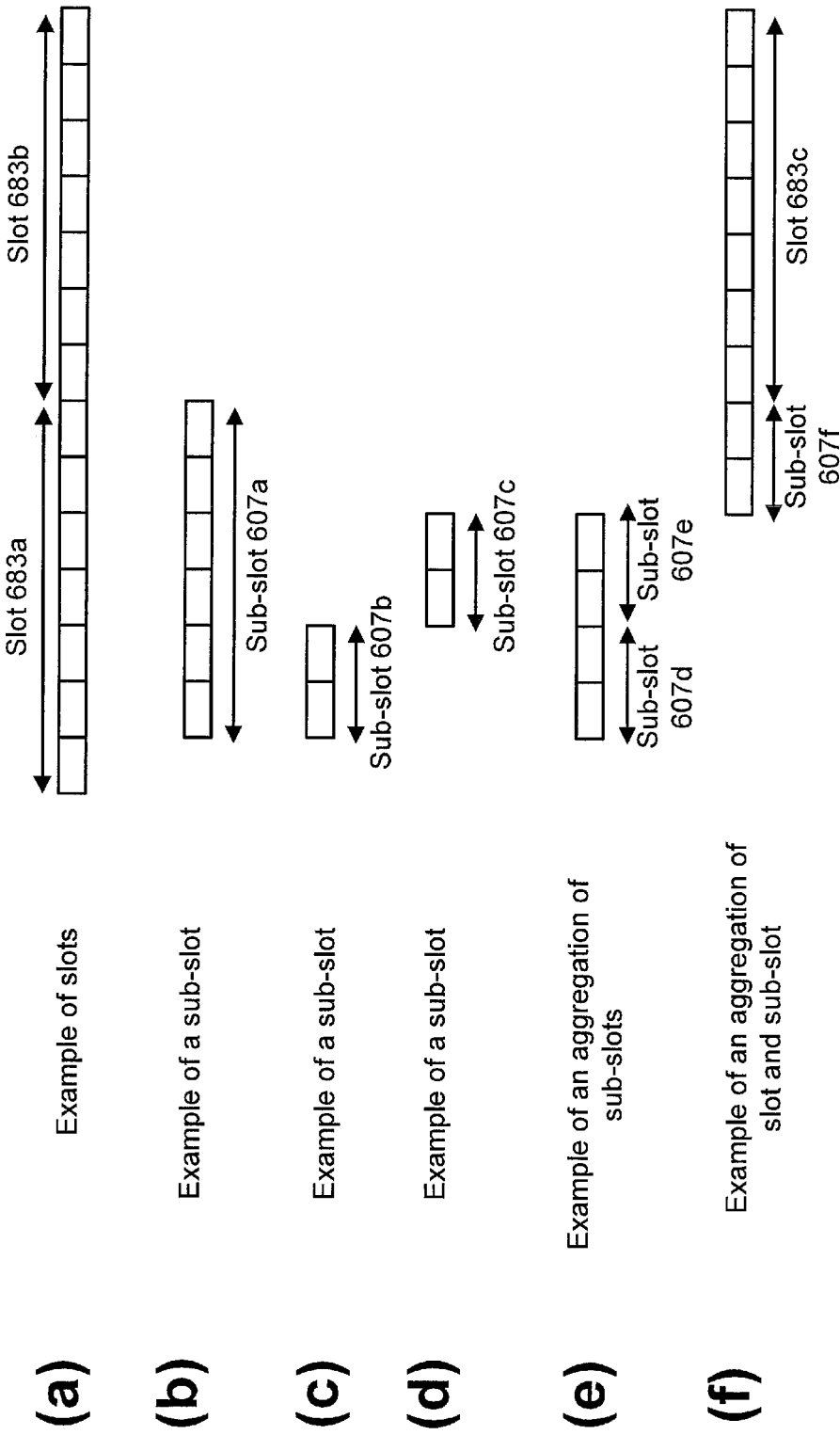
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
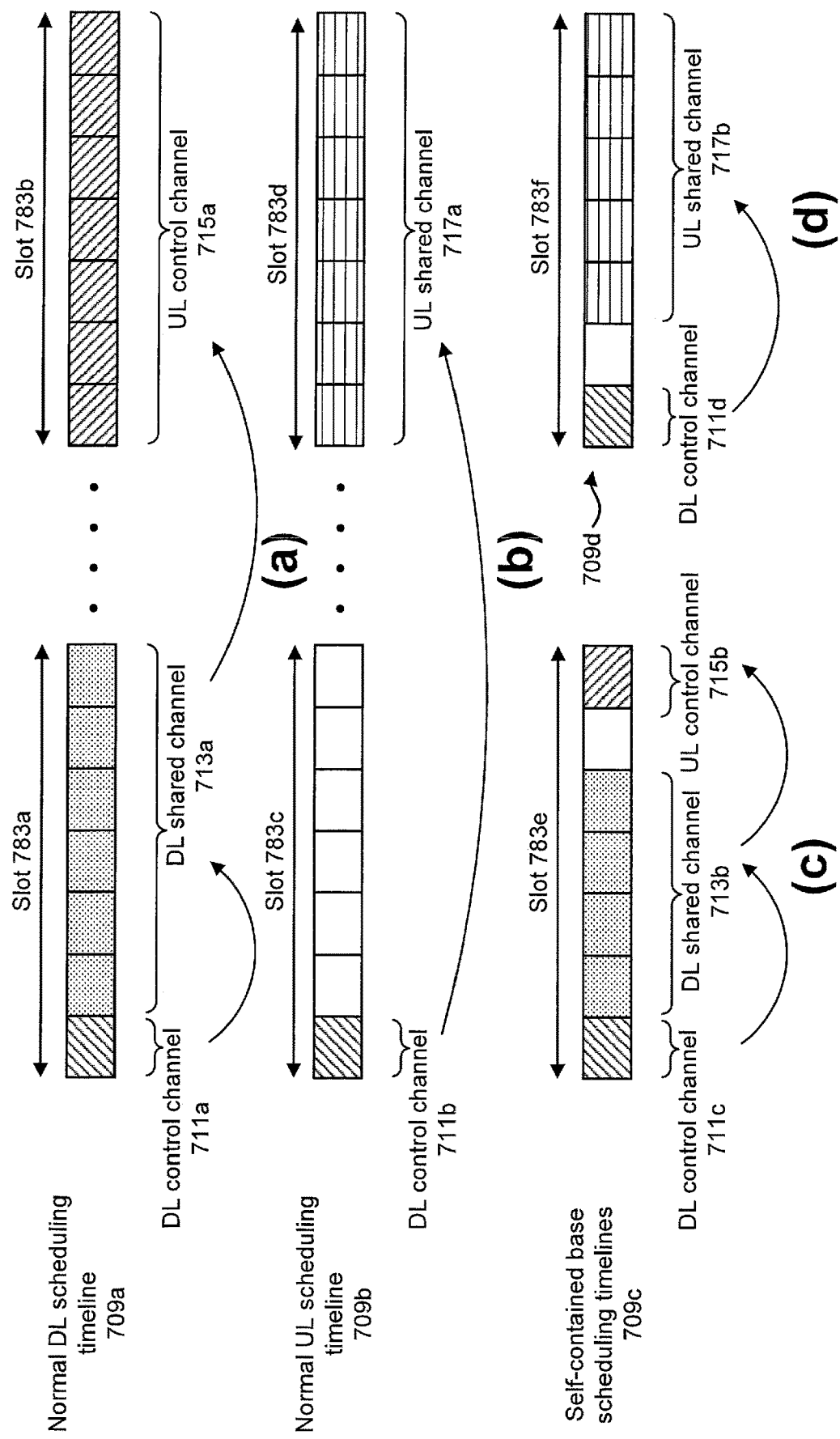
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
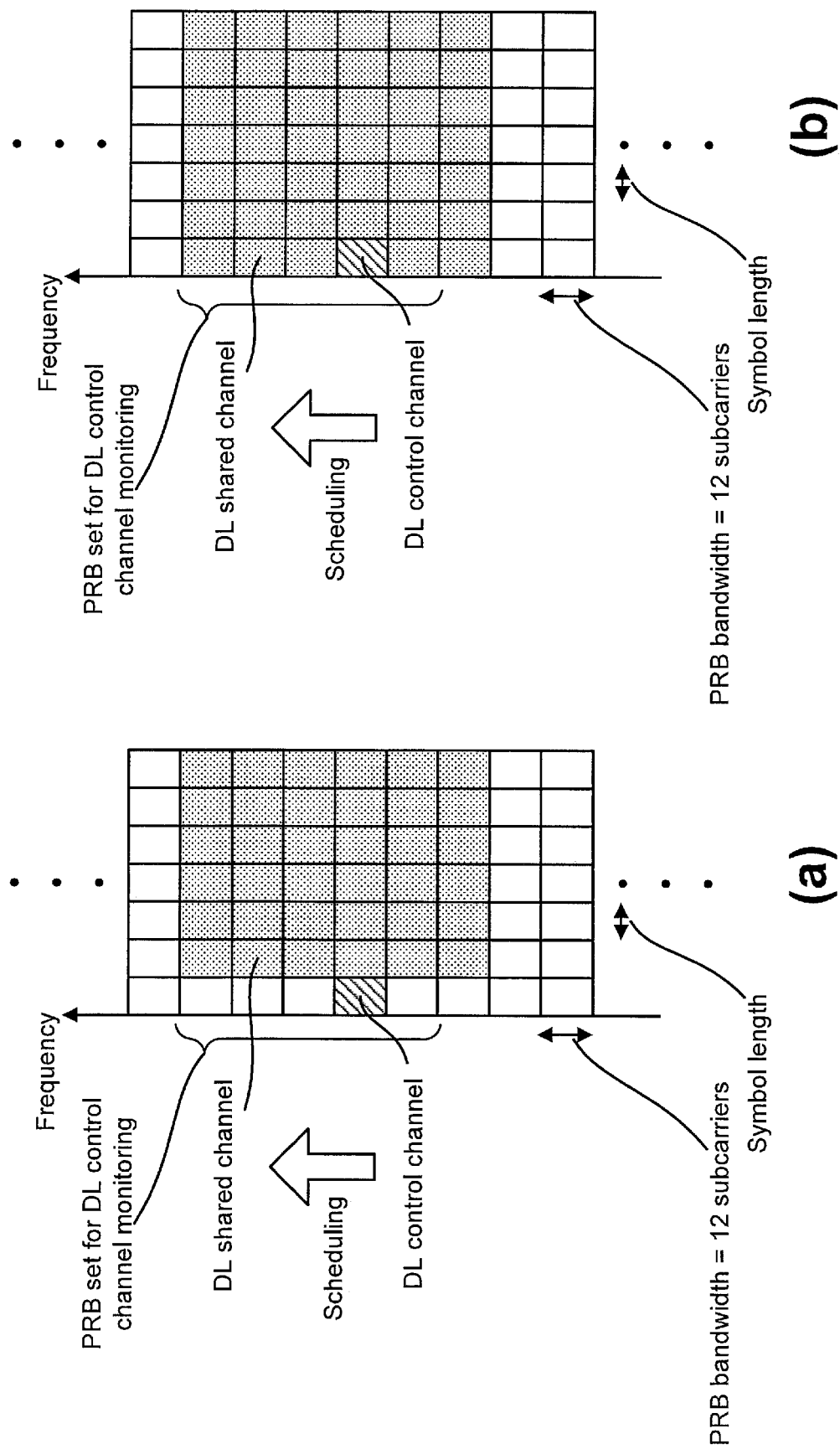
FIG. 8 shows examples of DL control channel monitoring regions.

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
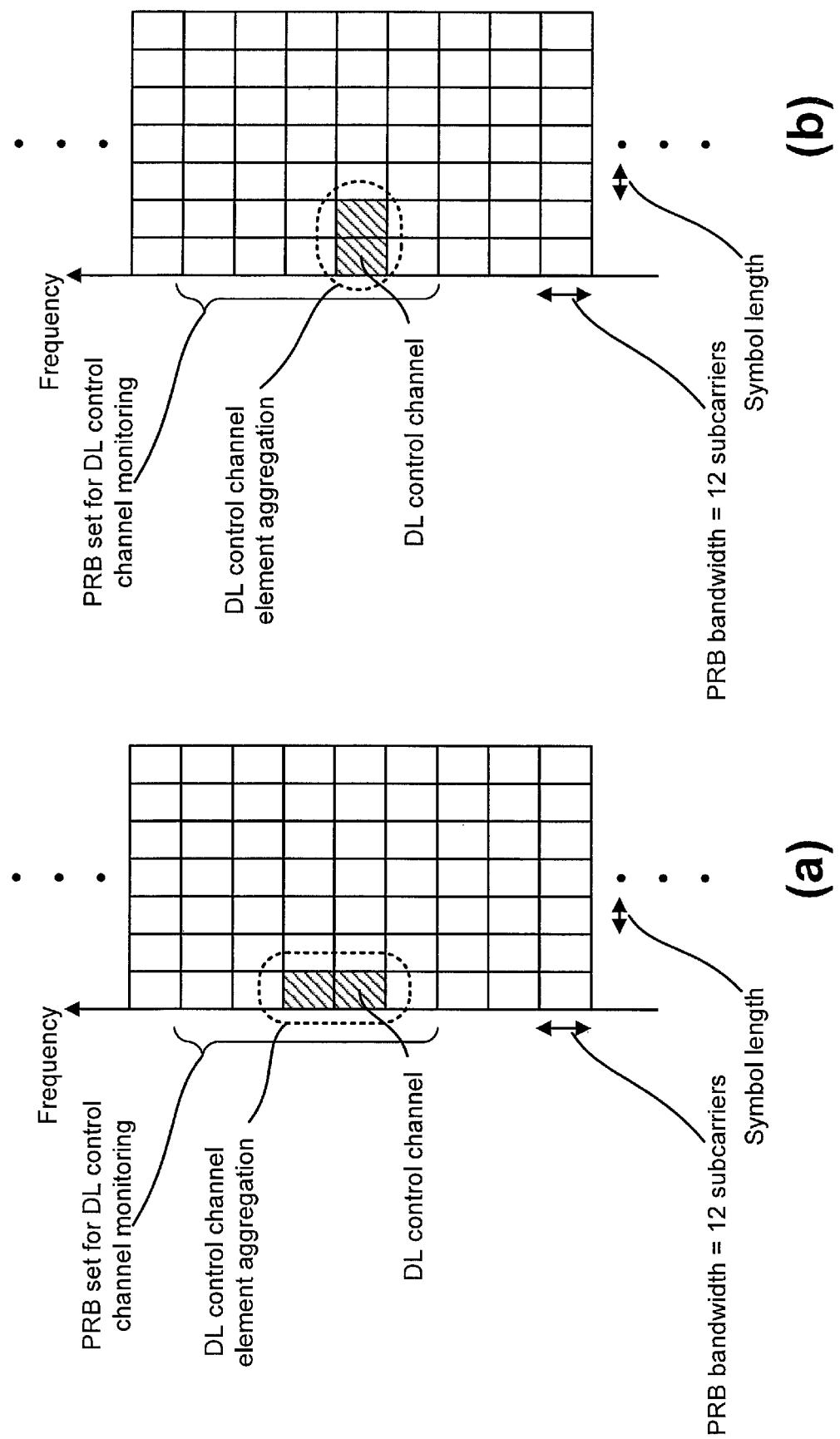
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
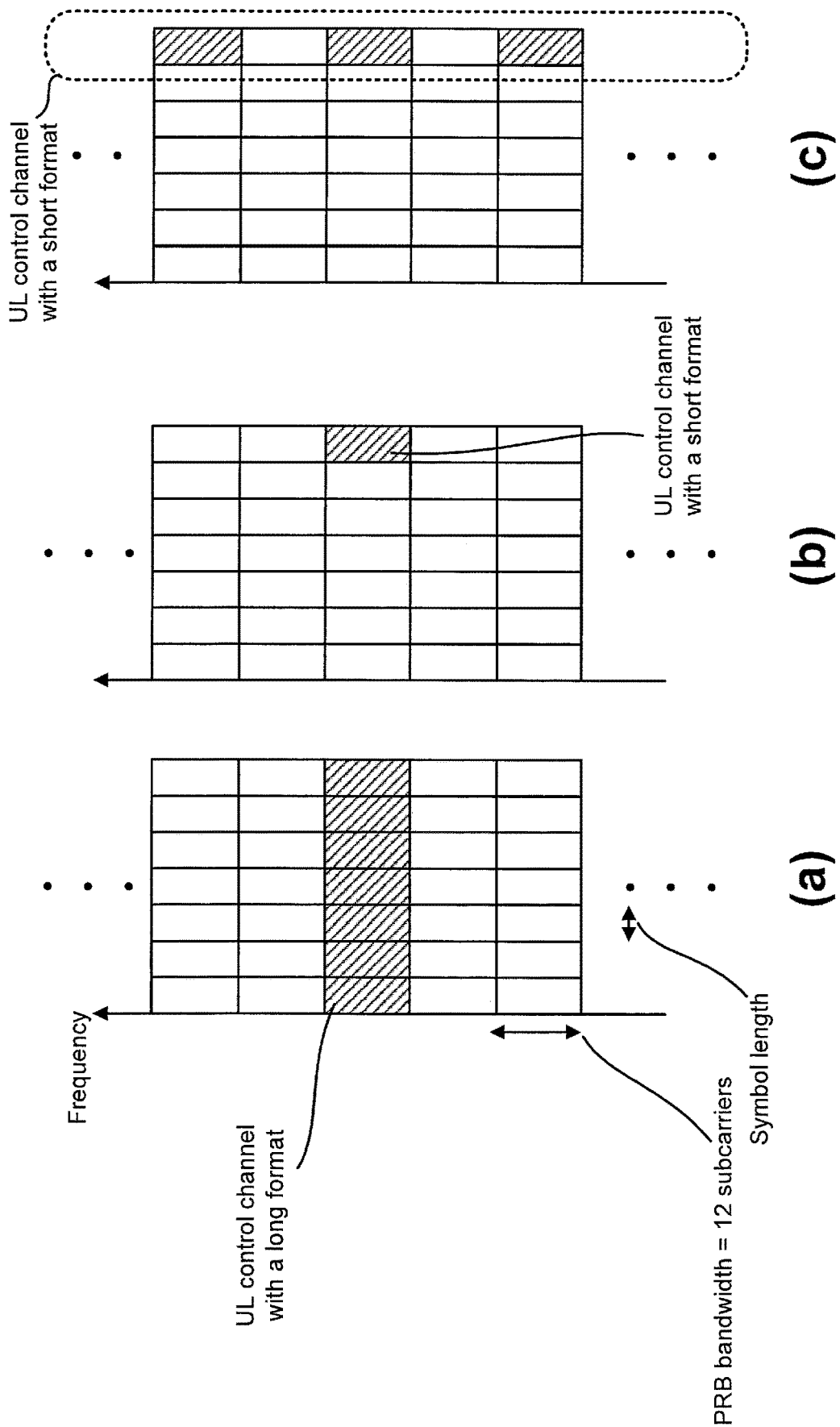
FIG. 10 shows examples of UL control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRB s. For example, interlaced mapping may be applied, namely the UL control channel may be mapped to every N PRBs (e.g. 5 or 10) within a system bandwidth.

Figure 11:
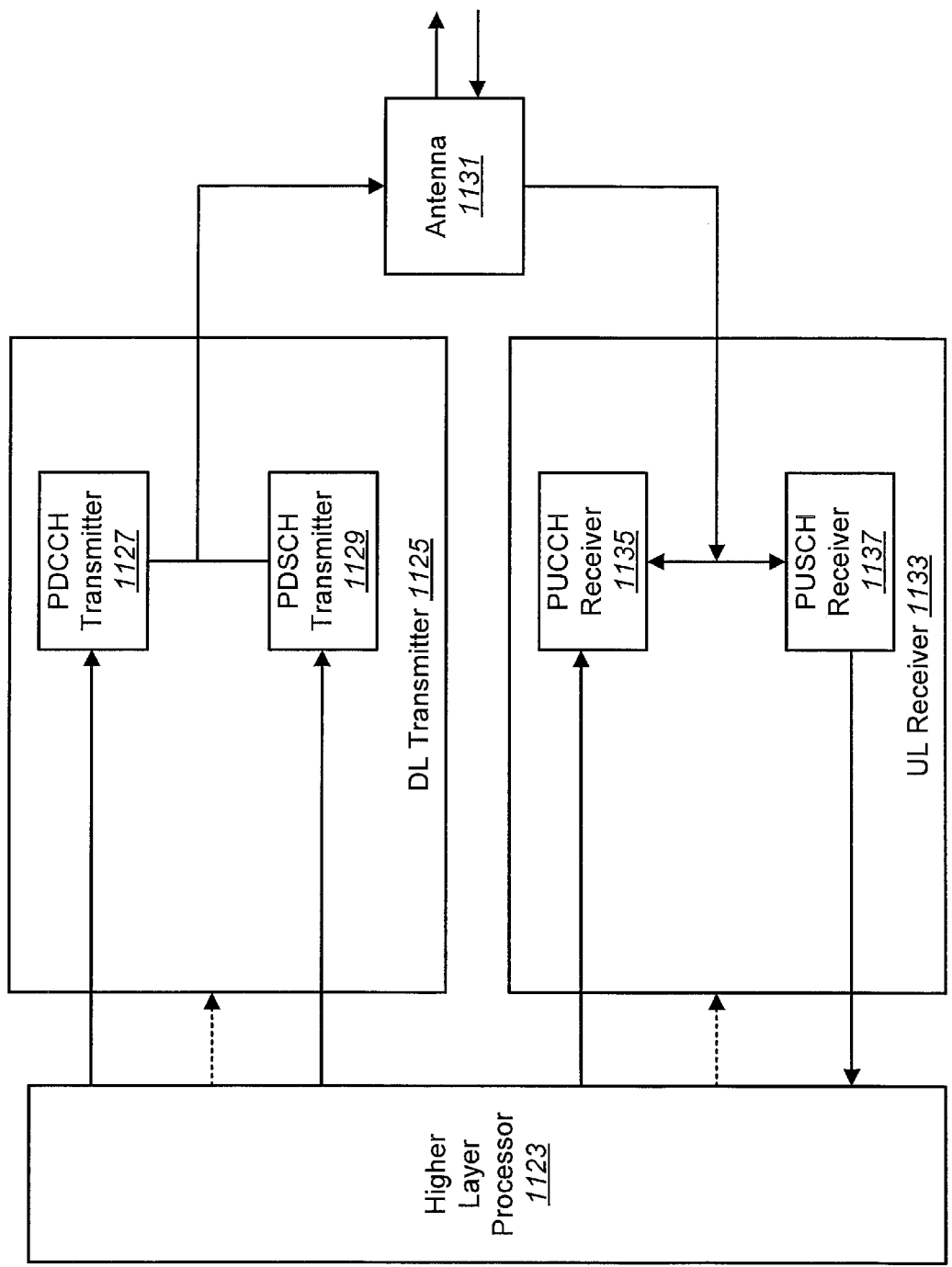
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
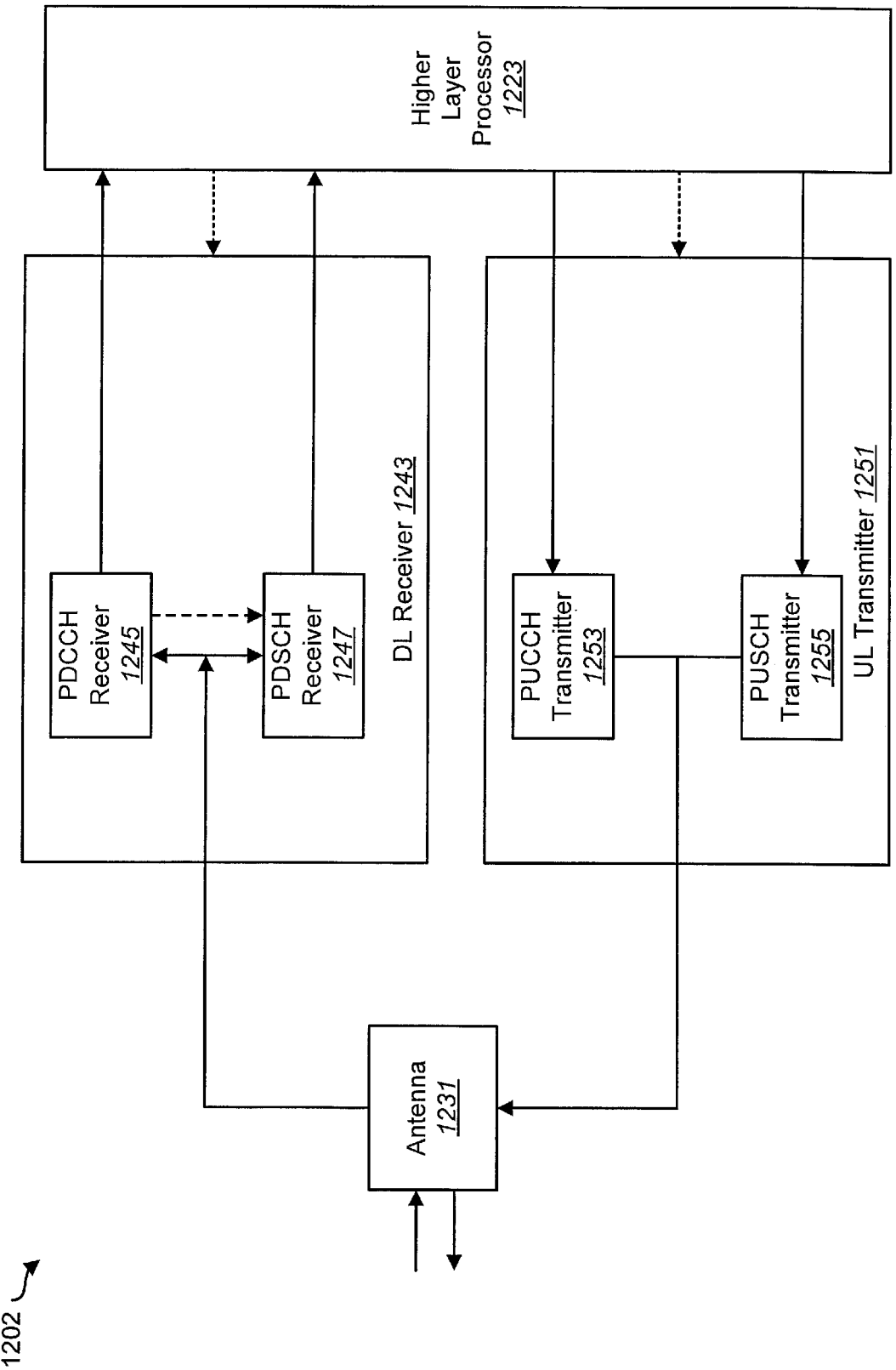
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
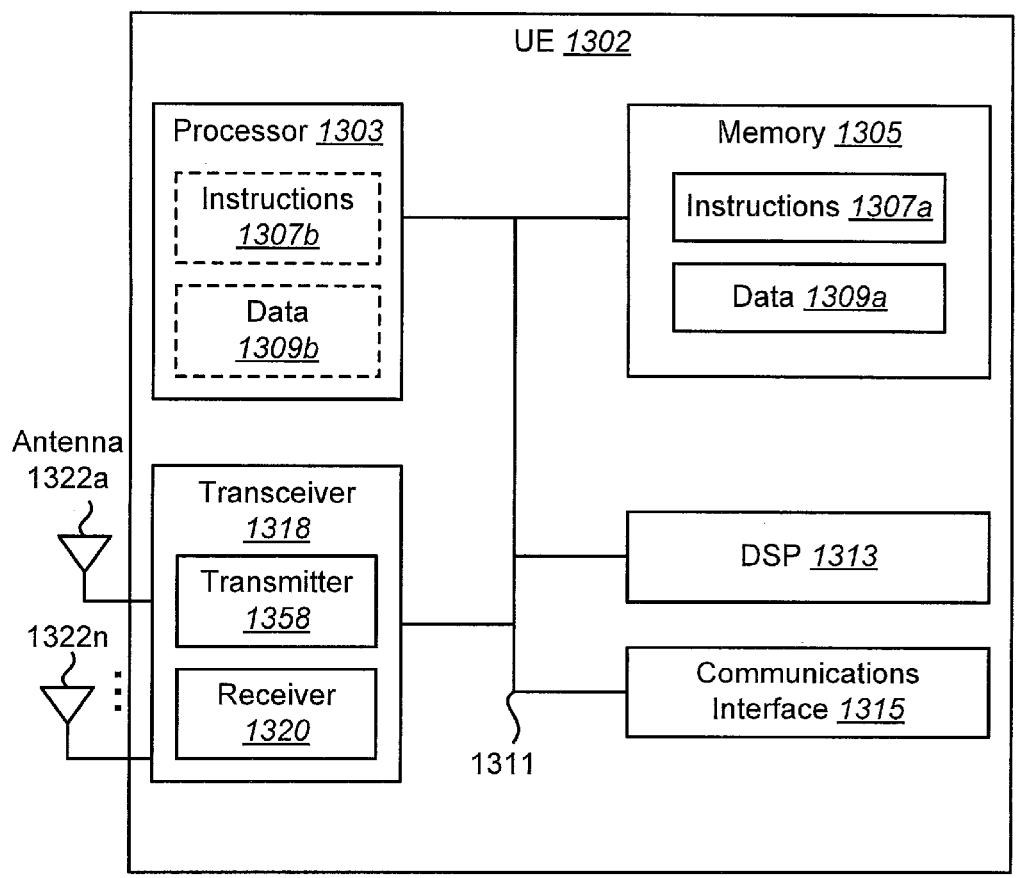
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
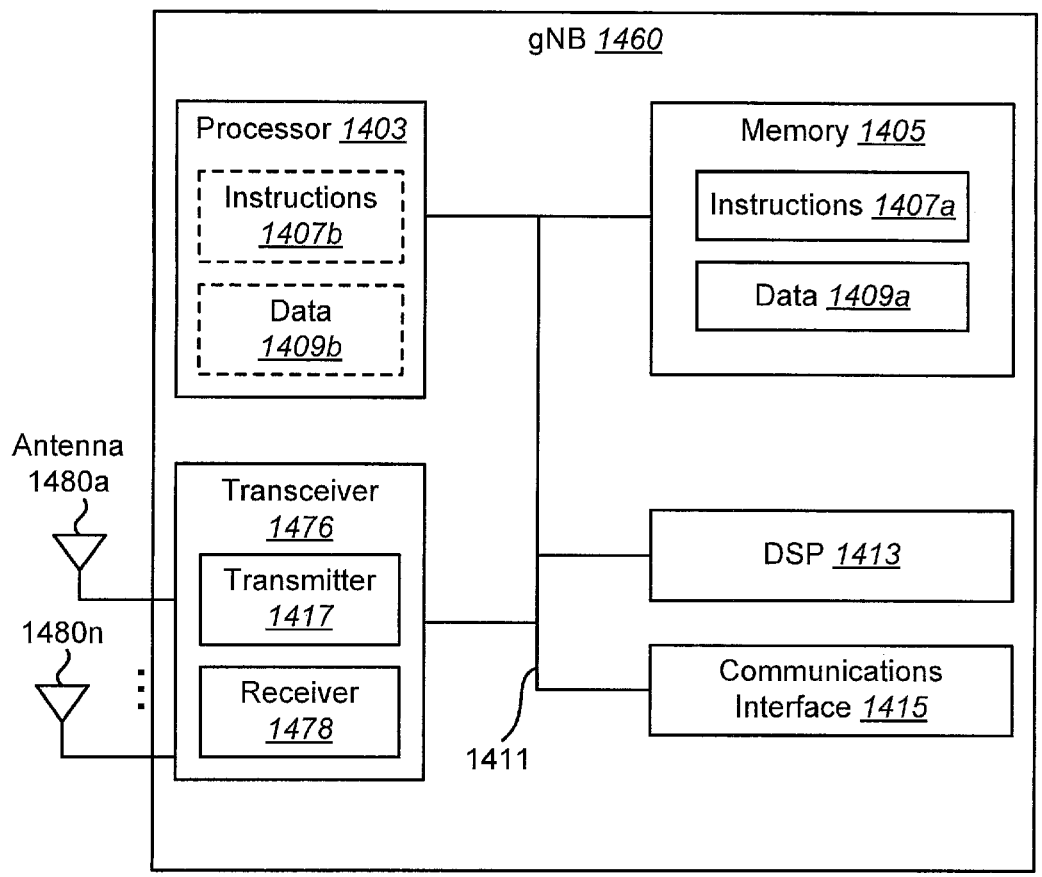
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
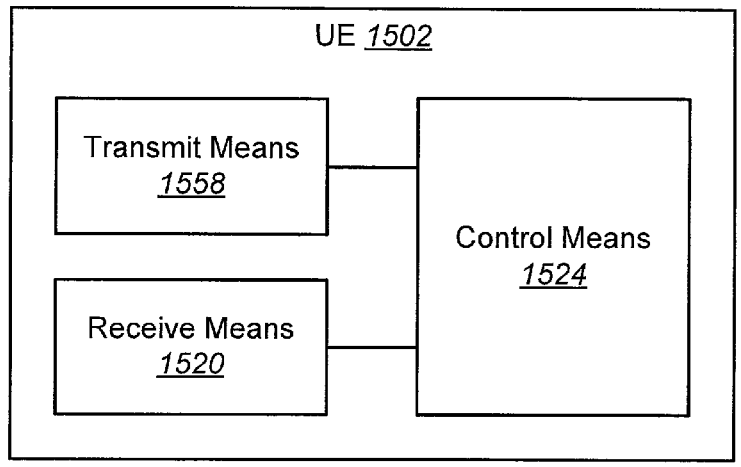
FIG. 15 is a block diagram illustrating one implementation of a UE in which systems and methods for ultra-reliable and low-latency communications may be implemented.

FIG. 15 is a block diagram illustrating one implementation of a UE 1502 in which systems and methods for ultra-reliable and low-latency communications may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
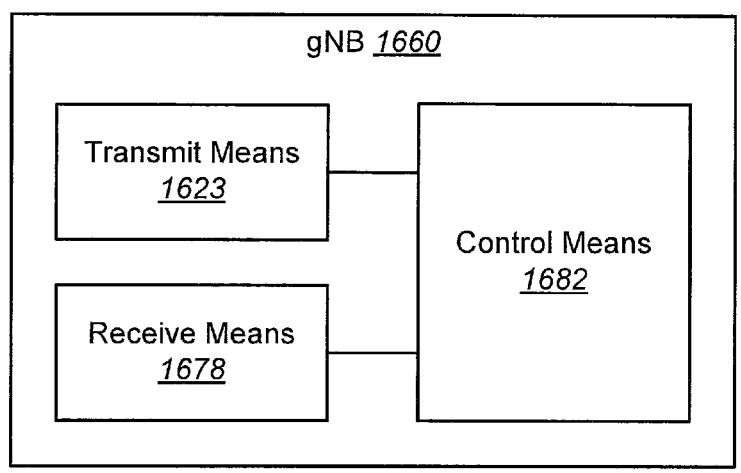
FIG. 16 is a block diagram illustrating one implementation of a gNB in which systems and methods for ultra-reliable and low-latency communications may be implemented.

FIG. 16 is a block diagram illustrating one implementation of a gNB 1660 in which systems and methods for ultra-reliable and low-latency communications may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Aspects of the present invention can also be expressed as follows:

A user equipment (UE) in accordance with Aspect 1 of the present invention is arranged to comprise: receiving circuitry configured to monitor a physical downlink control channel (PDCCH) conveying a pre-emption indication that indicates pre-emption of a physical uplink shared channel (PUSCH) transmission; the receiving circuitry configured to receive radio resource control (RRC) signaling that comprises a configuration for a configured grant and a configuration for grant-based PUSCH; a higher layer processor configured to determine whether to follow the configuration for the configured grant or the configuration for grant-based PUSCH for a scheduled retransmission of a transport block (TB) previously transmitted on a PUSCH with a configured grant; and transmitting circuitry configured to transmit or skip the PUSCH transmission based on the pre-emption indication.

A UE in accordance with Aspect 2 of the present invention can be arranged such that in Aspect 1: the UE follows the configuration for the configured grant for the scheduled retransmission.

A UE in accordance with Aspect 3 of the present invention can be arranged such that in Aspect 1: the UE follows the configuration for the grant-based PUSCH for the scheduled retransmission.

A UE in accordance with Aspect 4 of the present invention can be arranged such that in Aspect 1: whether the UE follows the configuration for the configured grant or the configuration for the grant-based PUSCH for the scheduled retransmission is configurable.

A UE in accordance with Aspect 5 of the present invention can be arranged such that in Aspect 1: whether the UE follows the configuration for the configured grant or the configuration for the grant-based PUSCH for the scheduled retransmission is based on a type of the configured grant.

A UE in accordance with Aspect 6 of the present invention can be arranged such that in Aspect 1: whether the UE follows the configuration for the configured grant or the configuration for the grant-based PUSCH for the scheduled retransmission is based on a downlink control information (DCI) format used for scheduling the scheduled retransmission.

A UE in accordance with Aspect 7 of the present invention can be arranged such that in Aspect 1: the UE monitors the pre-emption indication periodically and monitoring occasions are determined by higher layer parameters or indicated by L1 signaling.

A UE in accordance with Aspect 8 of the present invention can be arranged such that in Aspect 1: the UE monitors the pre-emption indication after a UL grant is detected until a corresponding UL transmission has finished or after the configured grant being activated or configured by RRC.

A base station (gNB) in accordance with Aspect 9 of the present invention is arranged to comprise: transmitting circuitry configured to send, to a user equipment (UE), a physical downlink control channel (PDCCH) conveying a pre-emption indication that indicates pre-emption of a physical uplink shared channel (PUSCH) transmission; the transmitting circuitry configured to send, to the UE, radio resource control (RRC) signaling that comprises a configuration for a configured grant and a configuration for grant-based PUSCH, wherein the UE determines whether to follow the configuration for the configured grant or the configuration for grant-based PUSCH for a scheduled retransmission of a transport block (TB) previously transmitted on a PUSCH with a configured grant; and receiving circuitry configured to receive the PUSCH transmission based on the pre-emption indication.

A gNB in accordance with Aspect 10 of the present invention can be arranged such that in Aspect 9: the UE follows the configuration for the configured grant for the scheduled retransmission.

A gNB in accordance with Aspect 11 of the present invention can be arranged such that in Aspect 9: the UE follows the configuration for the grant-based PUSCH for the scheduled retransmission.

A gNB in accordance with Aspect 12 of the present invention can be arranged such that in Aspect 9: whether the UE follows the configuration for the configured grant or the configuration for the grant-based PUSCH for the scheduled retransmission is configurable.

A gNB in accordance with Aspect 13 of the present invention can be arranged such that in Aspect 9: whether the UE follows the configuration for the configured grant or the configuration for the grant-based PUSCH for the scheduled retransmission is based on a type of the configured grant.

A gNB in accordance with Aspect 14 of the present invention can be arranged such that in Aspect 9: whether the UE follows the configuration for the configured grant or the configuration for the grant-based PUSCH for the scheduled retransmission is based on a downlink control information (DCI) format used for scheduling the scheduled retransmission.

A gNB in accordance with Aspect 15 of the present invention can be arranged such that in Aspect 9: the UE monitors the pre-emption indication periodically and monitoring occasions are determined by higher layer parameters or indicated by L1 signaling.

A gNB in accordance with Aspect 16 of the present invention can be arranged such that in Aspect 9: the UE monitors the pre-emption indication after a UL grant is detected until a corresponding UL transmission has finished or after the configured grant being activated or configured by RRC.

A method by a user equipment (UE) in accordance with Aspect 17 of the present invention is arranged to comprise: monitoring a physical downlink control channel (PDCCH) conveying a pre-emption indication that indicates pre-emption of a physical uplink shared channel (PUSCH) transmission; receiving radio resource control (RRC) signaling that comprises a configuration for a configured grant and a configuration for grant-based PUSCH; determining whether to follow the configuration for the configured grant or the configuration for grant-based PUSCH for a scheduled retransmission of a transport block (TB) previously transmitted on a PUSCH with a configured grant; and transmitting or skipping the PUSCH transmission based on the pre-emption indication.

A method by base station (gNB) in accordance with Aspect 18 of the present invention is arranged to comprise: sending, to a user equipment (UE), a physical downlink control channel (PDCCH) conveying a pre-emption indication that indicates pre-emption of a physical uplink shared channel (PUSCH) transmission; sending, to the UE, radio resource control (RRC) signaling that comprises a configuration for a configured grant and a configuration for grant-based PUSCH, wherein the UE determines whether to follow the configuration for the configured grant or the configuration for grant-based PUSCH for a scheduled retransmission of a transport block (TB) previously transmitted on a PUSCH with a configured grant; and receiving the PUSCH transmission based on the pre-emption indication.

What is claimed is:

1. A user equipment, comprising:
receiving circuitry configured to:
receive a first radio resource control (RRC) message comprising first information used for a physical uplink shared channel (PUSCH) transmission corresponding to a configured grant, the first information comprising first parameters and a second parameter, the first parameters being for power control, the second parameter being for configuring a type of frequency resource allocation,
receive a second RRC message comprising second information used for a PUSCH transmission scheduled by a first physical downlink control channel (PDCCH) with cyclic redundancy check (CRC) scrambled by a cell-radio network temporary identifier (C-RNTI), the second information comprising a third parameter for configuring a type of frequency resource allocation, and
monitor a second PDCCH with CRC scrambled by a configured scheduling radio network temporary identifier (CS-RNTI), the second PDCCH being used for scheduling a PUSCH retransmission corresponding to the configured grant; and
transmitting circuitry configured to:
perform a PUSCH initial transmission corresponding to the configured grant by using the first parameters and the second parameter, and
perform, based on detection of the second PDCCH, the PUSCH retransmission corresponding to the configured grant by using the first parameters and the third parameter.

2. A base station, comprising:
transmitting circuitry configured to:
transmit a first radio resource control (RRC) message comprising first information used for a physical uplink shared channel (PUSCH) transmission corresponding to a configured grant, the first information comprising first parameters and a second parameter, the first parameters being for power control, the second parameter being for configuring a type of frequency resource allocation,
transmit a second RRC message comprising second information used for a PUSCH transmission scheduled by a first physical downlink control channel (PDCCH) with cyclic redundancy check (CRC) scrambled by a cell-radio network temporary identifier (C-RNTI), the second information comprising a third parameter for configuring a type of frequency resource allocation, and
transmit a second PDCCH with CRC scrambled by a configured scheduling radio network temporary identifier (CS-RNTI), the second PDCCH being used for scheduling a PUSCH retransmission corresponding to the configured grant; and
receiving circuitry configured to:
receive a PUSCH initial transmission corresponding to the configured grant by using the first parameters and the second parameter, and
receive the PUSCH retransmission which is scheduled by the second PDCCH and corresponds to the configured grant by using the first parameters and the third parameter.

3. A method by a user equipment, comprising:
receiving a first radio resource control (RRC) message comprising first information used for a physical uplink shared channel (PUSCH) transmission corresponding to a configured grant, the first information comprising first parameters and a second parameter, the first parameters being for power control, the second parameter being for configuring a type of frequency resource allocation;
receiving a second RRC message comprising second information used for a PUSCH transmission scheduled by a first physical downlink control channel (PDCCH) with cyclic redundancy check (CRC) scrambled by a cell-radio network temporary identifier (C-RNTI), the second information comprising a third parameter for configuring a type of frequency resource allocation;
monitoring a second PDCCH with CRC scrambled by a configured scheduling radio network temporary identifier (CS-RNTI), the second PDCCH being used for scheduling a PUSCH retransmission corresponding to the configured grant;
performing a PUSCH initial transmission corresponding to the configured grant by using the first parameters and the second parameter; and
performing, based on detection of the second PDCCH, the PUSCH retransmission corresponding to the configured grant by using the first parameters and the third parameter.

4. A method by a base station, comprising:
transmitting a first radio resource control (RRC) message comprising first information used for a physical uplink shared channel (PUSCH) transmission corresponding to a configured grant, the first information comprising first parameters and a second parameter, the first parameters being for power control, the second parameter being for configuring a type of frequency resource allocation;

transmitting a second RRC message comprising second information used for a PUSCH transmission scheduled by a first physical downlink control channel (PDCCH) with cyclic redundancy check (CRC) scrambled by a cell-radio network temporary identifier (C-RNTI), the second information comprising a third parameter for configuring a type of frequency resource allocation;

transmitting a second PDCCH with CRC scrambled by a configured scheduling radio network temporary identifier (CS-RNTI), the second PDCCH being used for scheduling a PUSCH retransmission corresponding to the configured grant;

receiving a PUSCH initial transmission corresponding to the configured grant by using the first parameters and the second parameter; and receiving the PUSCH retransmission which is scheduled by the second PDCCH and corresponds to the configured grant by using the first parameters and the third parameter.

* * * * *